(12) United States Patent
Nakashita et al.

(10) Patent No.: US 12,001,730 B2
(45) Date of Patent: Jun. 4, 2024

(54) IMAGE FORMING APPARATUS, PRINTER DRIVER, AND SYSTEM FOR OUTPUTTING A PRINTED MATERIAL BASED ON A PRINT JOB

(71) Applicant: CANON KABUSHIKI KAISHA, Tokyo (JP)

(72) Inventors: Tsunahito Nakashita, Chiba (JP); Tsutomu Kubota, Chiba (JP); Manabu Hada, Tokyo (JP); Motoki Koshigaya, Saitama (JP); Tatsuya Ogawa, Ibaraki (JP); Hidetaka Tabuchi, Chiba (JP); Akitomo Fukui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/324,096

(22) Filed: May 25, 2023

(65) Prior Publication Data

US 2023/0384984 A1 Nov. 30, 2023

(30) Foreign Application Priority Data

May 31, 2022 (JP) ................................ 2022-088376

(51) Int. Cl.
*G06F 3/12* (2006.01)
(52) U.S. Cl.
CPC .......... *G06F 3/1204* (2013.01); *G06F 3/1259* (2013.01)

(58) Field of Classification Search
None
See application file for complete search history.

(56) References Cited

U.S. PATENT DOCUMENTS

| 2015/0378652 A1* | 12/2015 | Sakurai | ................. | G06F 3/1292 |
| | | | | 358/1.15 |
| 2021/0124539 A1* | 4/2021 | Matysiak | .............. | G06F 3/1294 |

FOREIGN PATENT DOCUMENTS

| JP | 2016130964 A | 7/2016 |
| JP | 2020150502 A | 9/2020 |

* cited by examiner

*Primary Examiner* — Andrew H Lam
(74) *Attorney, Agent, or Firm* — Canon U.S.A., Inc. IP Division

(57) ABSTRACT

An image forming apparatus performs printing based on a print job and receives a completion notification from an automatic printed material delivery apparatus. Based on receipt of the completion notification, the image forming apparatus transmits a receipt acknowledgement request to a personal computer (PC) corresponding to a user (a requested user or a designated user) based on the job. Further, the image forming apparatus receives, from the PC, an acknowledgement notification based on a user operation performed on the PC in connection with the receipt acknowledgement request. In response to receipt of the acknowledgement notification, the image forming apparatus registers information indicating that the printed material has been received by the user based on the job as a job log of the job.

9 Claims, 28 Drawing Sheets

FIG.6

| BASIC SETTING | PAGE SETTING | FINISHING | SHEET FEEDING | PRINT QUALITY |

FAVORITE SETTING (F): STANDARD SETTING   [ADD (1)...] [EDIT (2)...]
OUTPUT METHOD (M): PRINT

DOCUMENT SIZE (S): A4
OUTPUT SHEET SIZE (Z): SAME AS DOCUMENT SIZE
PAGE LAYOUT (Y): 1 IN 1 (STANDARD)
1-SIDED/2-SIDED/BOOKBINDING (T): 1-SIDED PRINTING
BINDING DIRECTION (B): LONG-SIDE BINDING (LEFT)
STAPLE/SORT/GROUP (H): SORT
COLOR MODE (C): AUTO (COLOR/MONOCHROME)

NUMBER OF COPIES (Q): 1 (1 TO 9999)
PRINT ORIENTATION (O): ● PORTRAIT ○ LANDSCAPE
☐ DESIGNATE COPY RATIO (N)
COPY RATIO (G): 100 % (25 TO 200)

A4 (COPY RATIO: AUTO)
[CHECK SETTING (V)]
[RESTORE TO STANDARD SETTING (R)]
221 — ☑ AUTOMATIC DELIVERY
222 — [ADVANCED SETTING (AD)]
223 — ☐ AUTHENTICATED RECEIPT
224 — [ADVANCED SETTING (S)]
225 — ☑ RECEIPT ACKNOWLEDGEMENT
226 — [ADVANCED SETTING (CK)]

[OK] [CANCEL] [HELP]
 227  228

| No. | DATE AND TIME | JOB NAME | PROCESSING STATE | DELIVERY DESTINATION ID | RECIPIENT ID | DELIVERY STATUS |
|---|---|---|---|---|---|---|
| 1 | 2021/11/29 9:00 | MATERIAL1.doc | PRINTED | — | — | — |
| 2 | 2021/11/29 10:00 | MATERIAL2.doc | PRINTED | ZZZ | — | DELIVERY COMPLETED |
| 3 | 2021/11/29 13:50 | MATERIAL3.doc | PRINTED | YYY | YYY | DELIVERY COMPLETED (RECEIVED) |
| 4 | 2021/11/29 14:10 | PRESENTATION.pdf | PRINTED | AAA | ? | DELIVERY COMPLETED (UNACKNOWLEDGED) |
| 5 | 2021/11/29 14:15 | DOCUMENT.doc | PRINTING | XXX | ? | PREPARING FOR DELIVERY |
| 6 | | | | | | |
| 7 | | | | | | |
| 8 | | | | | | |
| 9 | | | | | | |
| 10 | | | | | | |

FIG.7B

| No. | DATE AND TIME | JOB NAME | PROCESSING STATE | DELIVERY DESTINATION ID | RECIPIENT ID | DELIVERY STATUS |
|---|---|---|---|---|---|---|
| 1 | 2021/11/29 9:00 | MATERIAL1.doc | PRINTED | — | — | — |
| 2 | 2021/11/29 10:00 | MATERIAL2.doc | PRINTED | ZZZ | — | DELIVERY COMPLETED |
| 3 | 2021/11/29 13:50 | MATERIAL3.doc | PRINTED | YYY | YYY | DELIVERY COMPLETED (RECEIVED) |
| 4 | 2021/11/29 14:15 | PRESENTATION.pdf | PRINTED | AAA | AAA | DELIVERY COMPLETED (RECEIVED) |
| 5 | 2021/11/29 14:20 | DOCUMENT.doc | PRINTED | XXX | ? | DELIVERING |
| 6 | | | | | | |
| 7 | | | | | | |
| 8 | | | | | | |
| 9 | | | | | | |
| 10 | | | | | | |

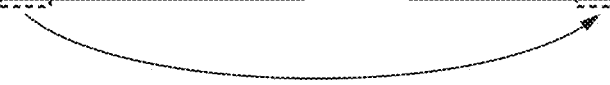

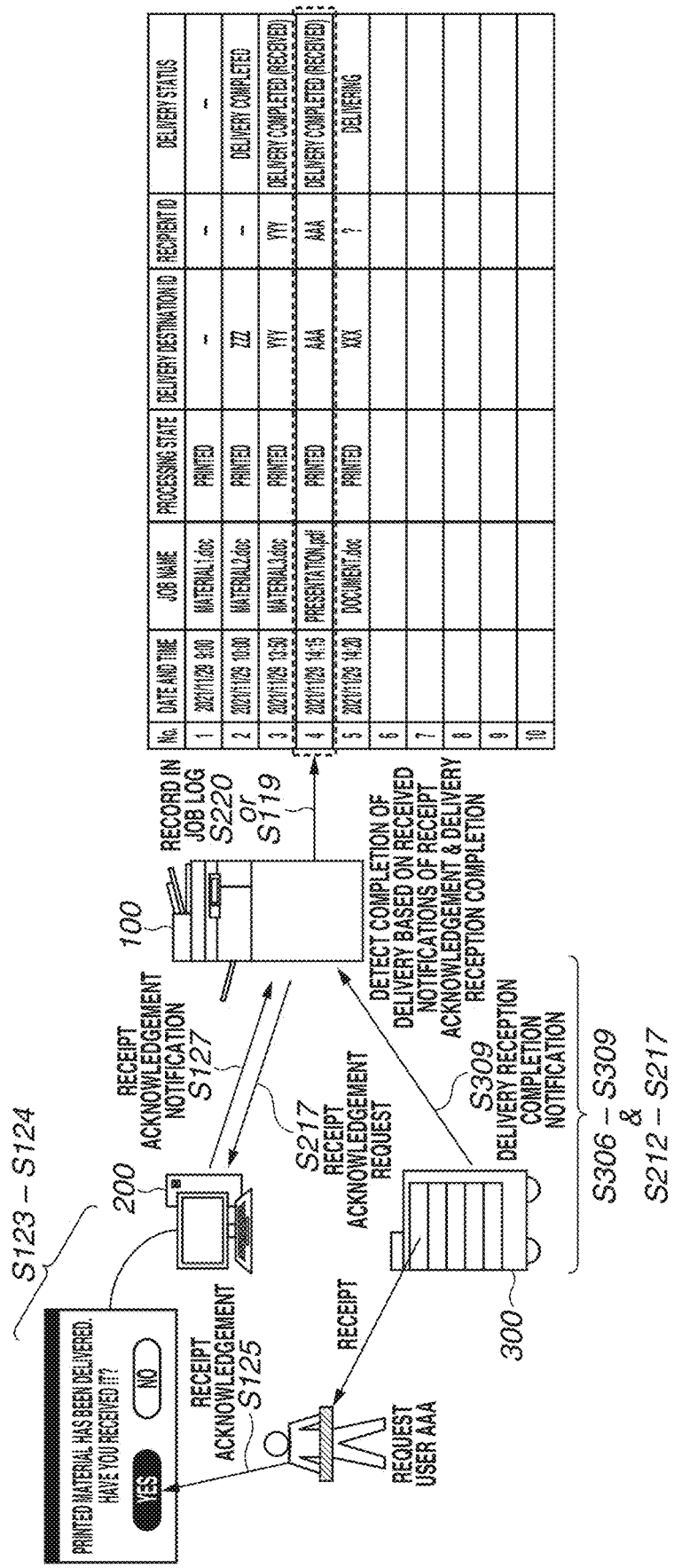

FIG.15A

| No. | DATE AND TIME | JOB NAME | PROCESSING STATE | DELIVERY DESTINATION ID | RECIPIENT ID | DELIVERY STATUS |
|---|---|---|---|---|---|---|
| 1 | 2021/11/29 9:00 | MATERIAL1.doc | PRINTED | — | — | — |
| 2 | 2021/11/29 10:00 | MATERIAL2.doc | PRINTED | ZZZ | — | DELIVERY COMPLETED |
| 3 | 2021/11/29 13:50 | MATERIAL3.doc | PRINTED | YYY | YYY | DELIVERY COMPLETED (RECEIVED) |
| 4 | 2021/11/29 14:10 | PRESENTATION.pdf | PRINTED | DDD | ? | DELIVERY COMPLETED (UNACKNOWLEDGED) |
| 5 | 2021/11/29 14:15 | DOCUMENT.doc | PRINTING | XXX | ? | PREPARING FOR DELIVERY |
| 6 | | | | | | |
| 7 | | | | | | |
| 8 | | | | | | |
| 9 | | | | | | |
| 10 | | | | | | |

FIG.15B

| No. | DATE AND TIME | JOB NAME | PROCESSING STATE | DELIVERY DESTINATION ID | RECIPIENT ID | DELIVERY STATUS |
|---|---|---|---|---|---|---|
| 1 | 2021/11/29 9:00 | MATERIAL1.doc | PRINTED | — | — | — |
| 2 | 2021/11/29 10:00 | MATERIAL2.doc | PRINTED | ZZZ | — | DELIVERY COMPLETED |
| 3 | 2021/11/29 13:50 | MATERIAL3.doc | PRINTED | YYY | YYY | DELIVERY COMPLETED (RECEIVED) |
| 4 | 2021/11/29 14:15 | PRESENTATION.pdf | PRINTED | DDD | DDD | DELIVERY COMPLETED (RECEIVED) |
| 5 | 2021/11/29 14:20 | DOCUMENT.doc | PRINTED | XXX | ? | DELIVERING |
| 6 | | | | | | |
| 7 | | | | | | |
| 8 | | | | | | |
| 9 | | | | | | |
| 10 | | | | | | |

FIG.23

| No. | DATE AND TIME | JOB NAME | PROCESSING STATE | DELIVERY DESTINATION ID | RECIPIENT ID | DELIVERY STATUS |
|---|---|---|---|---|---|---|
| 1 | 2021/11/29 9:00 | MATERIAL1.doc | PRINTED | — | — | — |
| 2 | 2021/11/29 10:00 | MATERIAL2.doc | PRINTED | ZZZ | — | DELIVERY COMPLETED |
| 3 | 2021/11/29 13:50 | MATERIAL3.doc | PRINTED | YYY | YYY | DELIVERY COMPLETED (RECEIVED) |
| 4 | 2021/11/29 14:15 | PRESENTATION.pdf | PRINTED | AAA | BBB | DELIVERY COMPLETED (RECEIVED) |
| 5 | 2021/11/29 14:20 | DOCUMENT.doc | PRINTED | XXX | ? | DELIVERING |
| 6 | | | | | | |
| 7 | | | | | | |
| 8 | | | | | | |
| 9 | | | | | | |
| 10 | | | | | | |

110

IMAGE FORMING APPARATUS, PRINTER DRIVER, AND SYSTEM FOR OUTPUTTING A PRINTED MATERIAL BASED ON A PRINT JOB

BACKGROUND

Field of the Disclosure

The present disclosure relates to an image forming apparatus, a printer driver, and a system.

Description of the Related Art

Printed material delivery apparatuses that deliver a printed material output by an image forming apparatus to a user have been discussed.

Japanese Patent Application Laid-Open NO. 2016-130964 discusses a printed material delivery apparatus that includes a plurality of storage trays and delivers a printed material output by an image forming apparatus to a location of a user requested the printed material (request user). According to Japanese Patent Application Laid-Open NO. 2016-130964, completion of the delivery of the printed material is detected based on operation of the printed material delivery apparatus directing a rear side opening portion for delivery of the printed material to the user after moving to the location of the request user or the operation of a printed material detection unit detecting removal of the printed material by the user.

Japanese Patent Application Laid-Open NO. 2020-150502 discusses a printed material delivery system including a request inquiry and reception unit in order to deliver a printed material as requested by a delivery destination user in a case where the delivery destination user is different from a user issued a print and delivery request. According to Japanese Patent Application Laid-Open NO. 2020-150502, completion of delivery of the printed material is detected based on the operation of a printed material delivery apparatus passing the printed material directly to the user using an arm of the printed material delivery apparatus after moving to a location of the destination user or based on the operation of the printed material delivery apparatus placing the printed material on a desk of the user.

Further, according to the conventional techniques, a printed material delivery apparatus having completed a delivery of a document transmits a completion notification to an image forming apparatus, and the image forming apparatus stores information indicating the completion of the delivery in a delivery job log.

SUMMARY

According to embodiments of the present disclosure, an image forming apparatus that outputs a printed material printed based on a job to a delivery apparatus and requests the delivery apparatus to deliver the printed material, the image forming apparatus includes a controller having one or more processors which executes instructions stored in one or more memories, the controller being configured to issue, in response to receipt of a completion notification indicating completion of delivery of the printed material based on the job from the delivery apparatus, a first acknowledgement request for an acknowledgement of receipt of the printed material to an information processing apparatus corresponding to a user based on the job, and register, in response to receipt, from the information processing apparatus, of a first acknowledgement notification indicating an acknowledgement of receipt of the printed material by the user based on a user operation performed on the information processing apparatus in connection with the first acknowledgement request, information indicating receipt of the printed material by the user based on the job as a log of the job.

Further features of the present disclosure will become apparent from the following description of exemplary embodiments with reference to the attached drawings.

BRIEF DESCRIPTION OF THE DRAWINGS

FIG. 6 is a diagram illustrating a printer driver setting screen according to an exemplary embodiment of the present disclosure.

FIGS. 7A and 7B are diagrams illustrating a job log management table according to a first exemplary embodiment.

FIG. 12B is a diagram illustrating a procedure from an arrival of the automatic printed material delivery apparatus at a destination to recording of a delivery log according to the first exemplary embodiment.

FIGS. 15A and 15B are diagrams illustrating a job log management table according to the second exemplary embodiment.

FIG. 23 is a diagram illustrating a job log management table according to the third exemplary embodiment.

DESCRIPTION OF THE EMBODIMENTS

Various exemplary embodiments of the present disclosure will be described below with reference to the drawings. It is to be noted that components described in the exemplary embodiments are mere examples and are not intended to limit the scope of the disclosure to the components.

Figure 1:
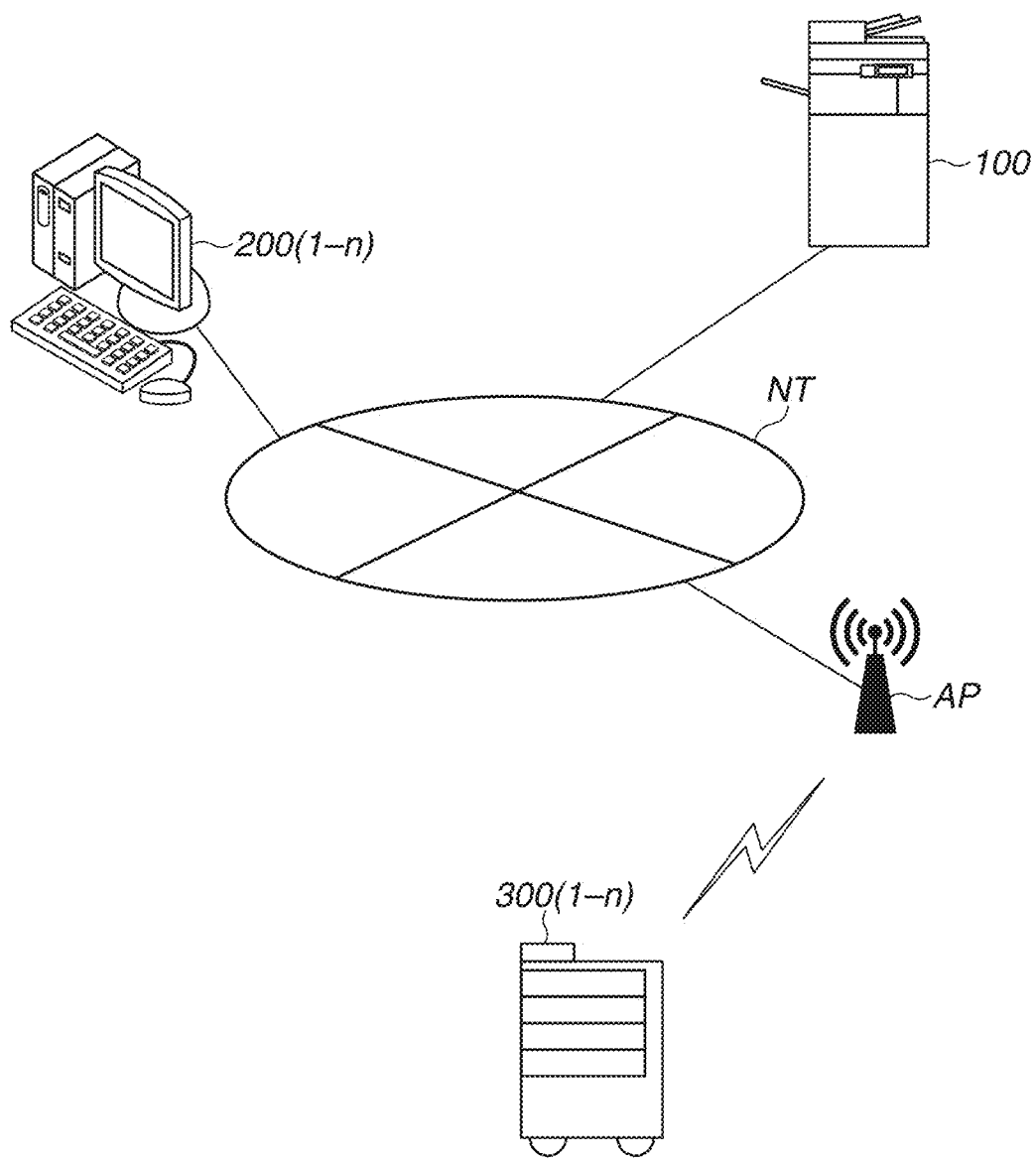
FIG. 1 is a diagram conceptually illustrating a configuration of an image forming system according to an exemplary embodiment of the present disclosure.

FIG. 1 is a diagram conceptually illustrating a configuration of an image forming system according to an exemplary embodiment of the present disclosure and illustrates connections between apparatuses in an office.

An image forming apparatus 100 and a personal computer (PC) 200 as an information processing apparatus are connected together to communicate with each other via a network NT. In reality, a plurality of PCs 200, which are PCs 201, 202, 203, and so forth (not illustrated), is connected to the network NT, and a plurality of image forming apparatuses 100 is also connected to the network NT.

The network NT is also connected to an access point AP and can communicate, via the access point AP, with devices connected via a wireless local area network (wireless LAN). An automatic printed material delivery apparatus 300 has a wireless LAN function and can communicate with the image forming apparatus 100 via the access point AP. The automatic printed material delivery apparatus 300 is a printed material delivery robot configured to receive printed materials from the image forming apparatus 100 and deliver the printed materials.

Connection forms of the devices are not limited to the foregoing connection form. For example, the image forming apparatus 100 and the PC 200 can each have a wireless LAN function to connect to the access point AP using the wireless LAN function. Further, the image forming apparatus 100 can function as an access point, and the automatic printed material delivery apparatus 300 can connect to the access point.

Figure 2:
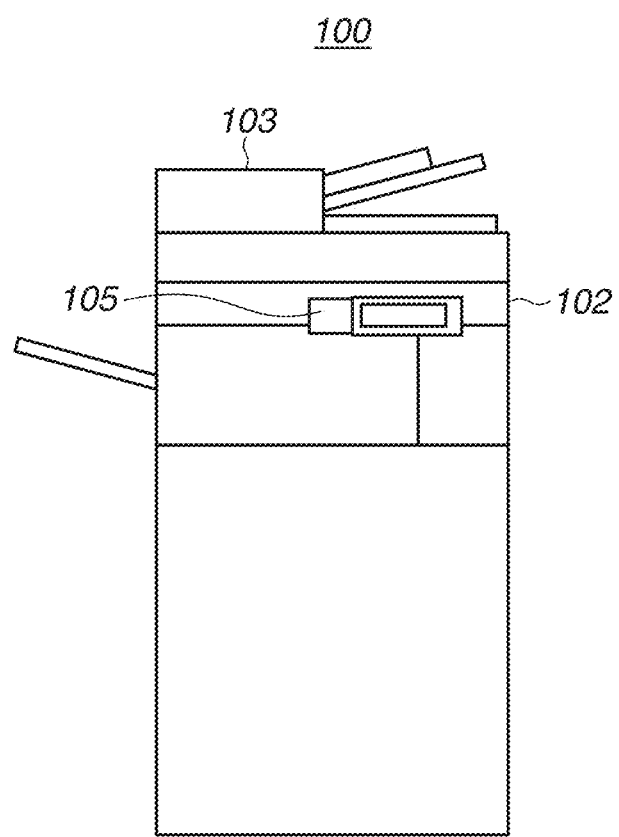
FIG. 2 is a diagram illustrating an external view of an image forming apparatus according to an exemplary embodiment of the present disclosure.

FIG. 2 is a diagram illustrating an example of an external view of the image forming apparatus 100 according to the present exemplary embodiment.

The image forming apparatus 100 is, for example, a multi-function peripheral (MFP) with a plurality of functions, such as print, scanner, copy, and fax functions.

The image forming apparatus 100 includes an operation panel 102, a read unit 103, and a card reader unit 105. The image forming apparatus 100 transfers a document to be delivered and provides a delivery destination and authentication information for the delivery to the automatic printed material delivery apparatus 300 and issues instructions based on notifications from the automatic printed material delivery apparatus 300.

The image forming apparatus 100 can be a single-function peripheral (SFP) that has a print function and is capable of transferring printed materials to the automatic printed material delivery apparatus 300.

Figure 3:
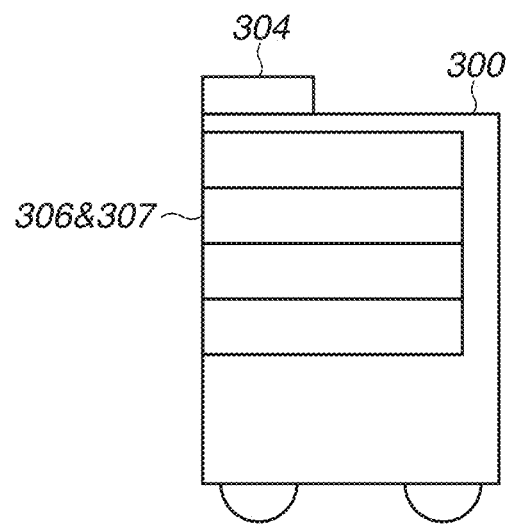
FIG. 3 is a diagram illustrating an external view of an automatic printed material delivery apparatus according to an exemplary embodiment of the present disclosure.

FIG. 3 is a diagram illustrating an example of an external view of the automatic printed material delivery apparatus 300 according to the present exemplary embodiment.

The automatic printed material delivery apparatus 300 receives a printed material output by the image forming apparatus 100, stores the received printed material in the automatic printed material delivery apparatus 300, and delivers the stored printed material to a specified place.

The automatic printed material delivery apparatus 300 has two sections.

The first one is a vehicle unit 302 in FIG. 5 described below. The vehicle unit 302 is configured to move to a specified place based on map information stored in advance.

The second one is a delivery apparatus control unit 301 in FIG. 5 described below. The delivery apparatus control unit 301 receives a delivery target document from the image forming apparatus 100, communicates with the image forming apparatus 100, provides information to be used to the vehicle unit 302, and controls the vehicle unit 302.

The delivery apparatus control unit 301 includes an operation panel 304, a collection unit 306, and a discharge unit 307. The operation panel 304 includes a display unit 304a and an operation input unit 304b. In a case where an authentication setting is set for a print job corresponding to a stored printed material, which means that in a case where authentication code information is included in the print job, the delivery apparatus control unit 301 performs control, in response to the operation panel 304 receiving an input of information that matches the set authentication code information, to be ready for delivery of the stored printed material to a user.

Figure 4:
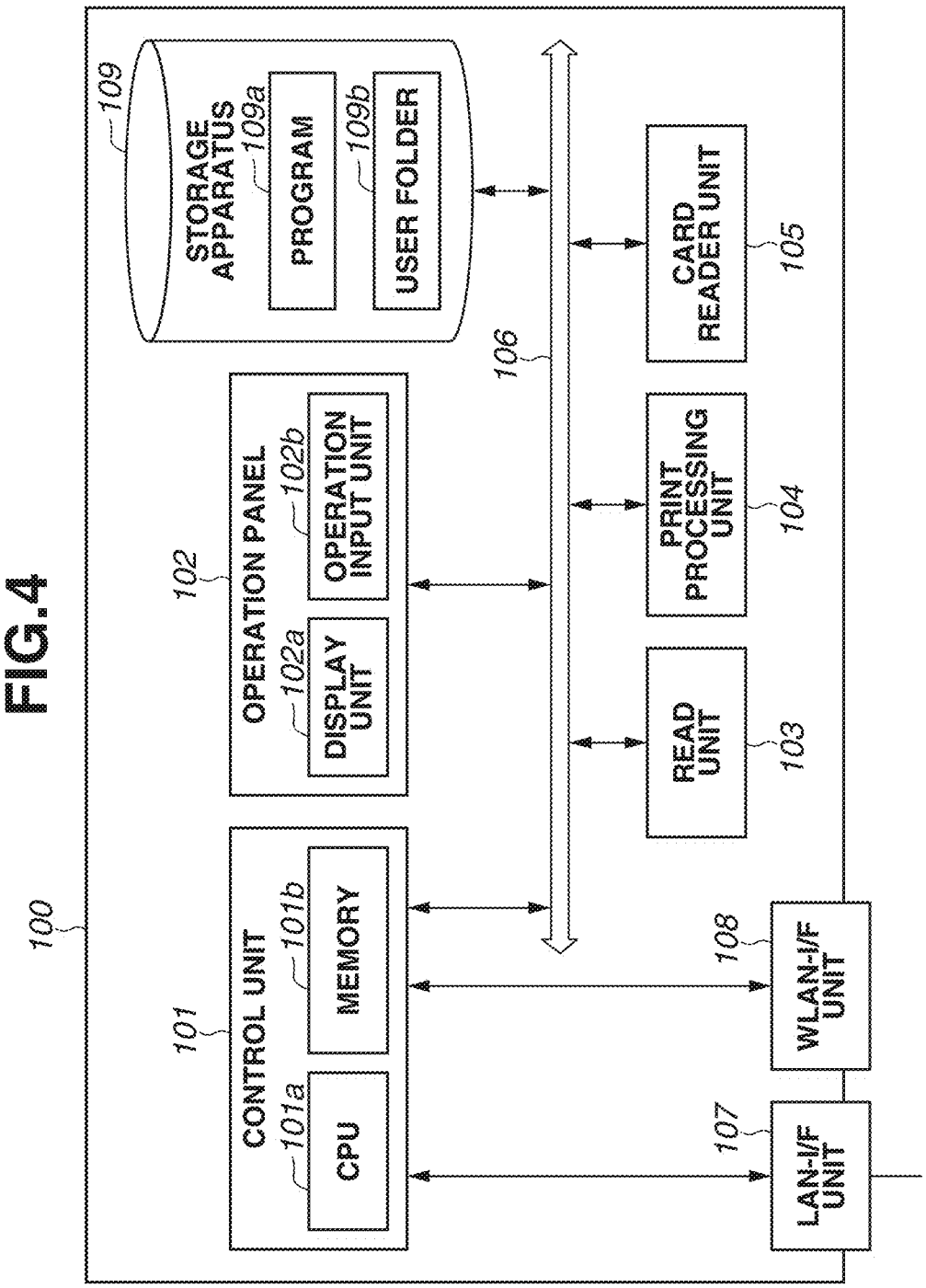
FIG. 4 is a block diagram illustrating a hardware configuration of the image forming apparatus according to an exemplary embodiment of the present disclosure.

FIG. 4 is a block diagram illustrating an example of a hardware configuration of the image forming apparatus 100.

The image forming apparatus 100 includes a control unit 101, the operation panel 102, the read unit 103, a print processing unit 104, the card reader unit 105, and a storage apparatus 109 connected together via a bus 106 to communicate with each other. The image forming apparatus 100 further includes a local area network (LAN) interface (I/F) (LAN-I/F) unit 107 for connecting to a wired network and communicating with external apparatuses and a wireless LAN interface (WLAN-I/F) unit 108 for connecting to a wireless network and communicating with external apparatuses.

The control unit 101 controls operations of the image forming apparatus 100. The operation panel 102 is a user interface. The read unit 103 reads documents and generates image data. The print processing unit 104 performs print processing based on image data. The card reader unit 105 reads cards for performing personal authentication of users. The storage apparatus 109 stores various types of information including a program 109a. The storage apparatus 109 is able to store a print job in a user folder 109b.

The control unit 101 includes a central processing unit (CPU) 101a and a memory 101b and controls operations of each component. The CPU 101a reads the program 109a stored in the storage apparatus 109 and executes the program 109a. The program 109a is a program for causing the control unit 101 to function as various processing units described below. The memory 101b stores temporary data in execution of the program 109a by the CPU 101a.

The operation panel 102 includes a configuration for inputting operation instructions from users. Specifically, the operation panel 102 includes, for example, a display unit 102a and an operation input unit 102b. The display unit 102a includes a liquid crystal panel and displays various pieces of information. The operation input unit 102b receives operation instructions from users by detecting operations performed on the display unit 102a.

Figure 5:
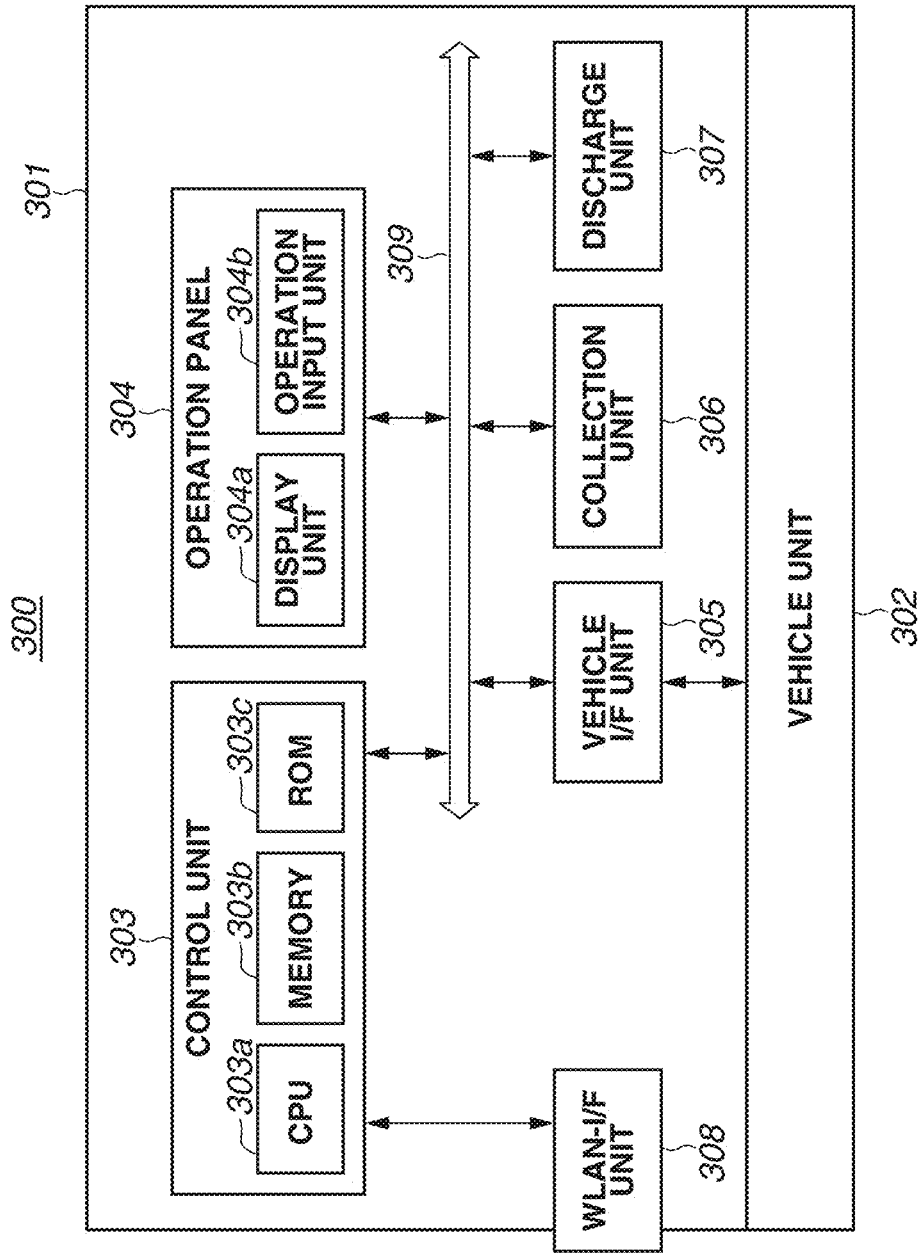
FIG. 5 is a block diagram illustrating a hardware configuration of the automatic printed material delivery apparatus according to an exemplary embodiment of the present disclosure.

FIG. 5 is a hardware block diagram illustrating an example of a hardware configuration of the automatic printed material delivery apparatus 300.

As illustrated in FIG. 5, the automatic printed material delivery apparatus 300 includes the delivery apparatus control unit 301 and the vehicle unit 302. The delivery apparatus control unit 301 controls operation of the automatic printed material delivery apparatus 300. The vehicle unit 302 has a function of moving to specified location information based on the map information stored in advance.

The delivery apparatus control unit 301 includes a control unit 303, the operation panel 304, a vehicle interface unit (vehicle I/F unit) 305, the collection unit 306, and the discharge unit 307 which are connected each together via a bus 309 to communicate with each other. The delivery apparatus control unit 301 further includes a WLAN-I/F unit 308 for connecting to a wireless network and communicating with external apparatuses.

The control unit 303 controls operations of the delivery apparatus control unit 301. The operation panel 304 is a user interface. The vehicle I/F unit 305 communicates with the vehicle unit 302. The collection unit 306 receives documents output by the image forming apparatus 100 and stores the received documents. The discharge unit 307 discharges a document stored in the collection unit 306 to the outside.

The collection unit 306 and the discharge unit 307 may be physically integrated together and may include an arm (not illustrated) for collecting and discharging printed materials. Further, the collection unit 306 and the discharge unit 307 may include a sensor (not illustrated) for detecting whether there is a printed material. Detection of a delivery of a printed material by the automatic printed material delivery apparatus 300 with the arm is determined based on completion of a discharge of the printed material by the arm. In a case of the automatic printed material delivery apparatus 300 without the arm, the collection unit 306 and the discharge unit 307 are in the shape of a tray or a box, and the sensor provided in the collection unit 306 and the discharge unit 307 detects whether there is a printed material, and detection of a delivery of a printed material is determined based on removal of the printed material by the sensor. The procedure for determining whether a delivery is completed are not limited to those described above.

As described above, in a case where authentication code information is set for a print job corresponding to a printed material stored in the collection unit 306, the control unit 303 performs control, in response to an operation input unit 304b receiving an input of information that matches the authentication code information, to be ready for discharge of the printed material from the discharge unit 307.

The control unit 303 includes a CPU 303a, a memory 303b, and a read-only memory (ROM) 303c and controls operations of each component. The CPU 303a reads a program stored in the ROM 303c and executes the read program. The program causes the control unit 303 to function as various processing units described below. The memory 303b stores temporary data in execution of the program by the CPU 303a. The ROM 303c stores operation programs of the delivery apparatus control unit 301.

The operation panel 304 includes a configuration for receiving operation instructions from users. Specifically, the operation panel 304 includes, for example, the display unit 304a and the operation input unit 304b. The display unit 304a includes a liquid crystal panel and displays various pieces of information. The operation input unit 304b inputs operation instructions from users by detecting operations performed on the display unit 304a.

Operations of printing data generated by the PC 200 using the image forming apparatus 100 by a user, delivering a printed material to the user, acknowledging receipt of the printed material by the user, and then recording a delivery log will be described below with reference to FIGS. 6 to 12.

Figure 12A:
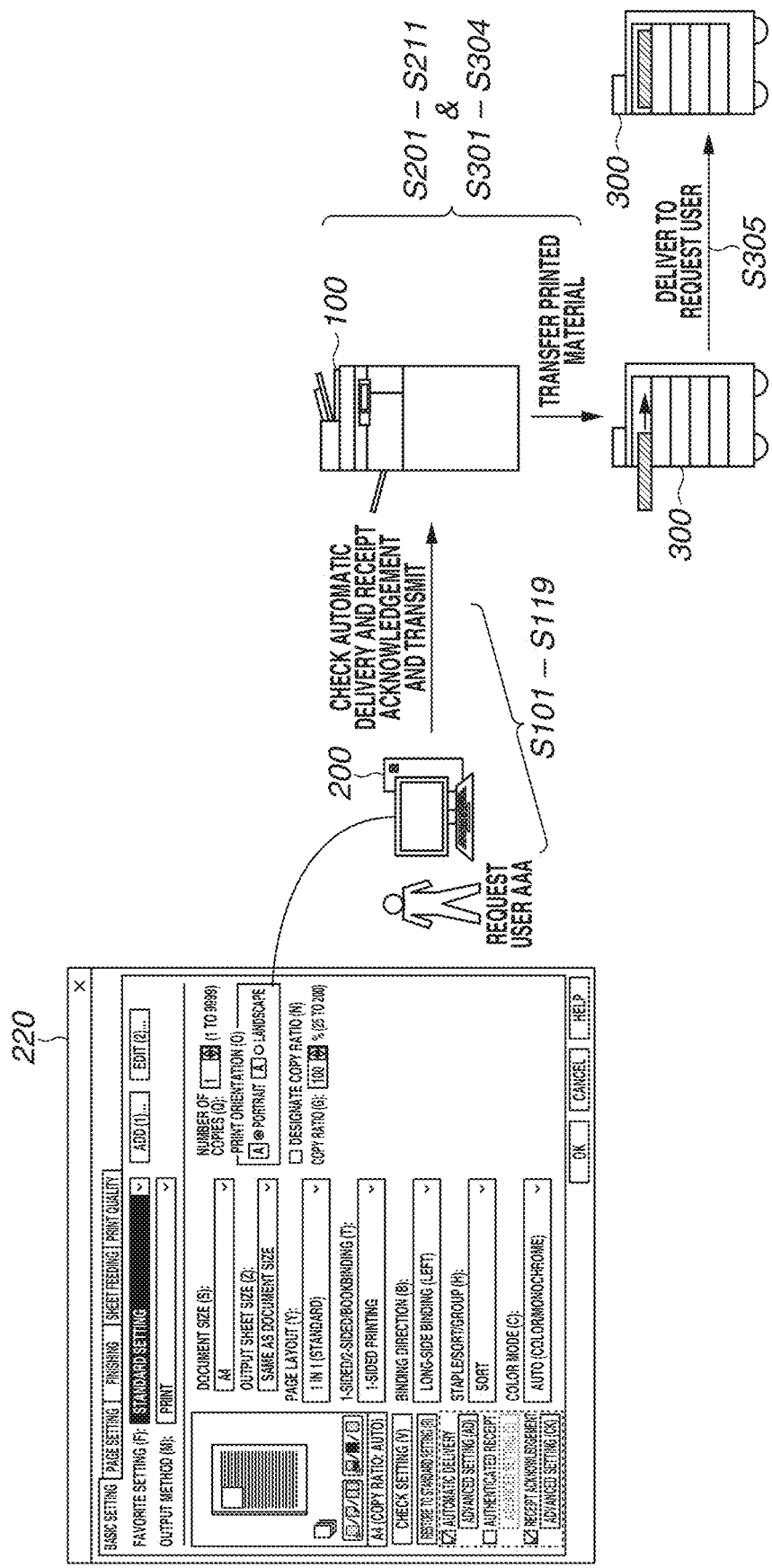
FIG. 12A is a diagram illustrating a procedure from an operation on the PC to a departure of the automatic printed material delivery apparatus for delivery according to the first exemplary embodiment.

FIG. 12A is a diagram illustrating an example of a procedure from an operation on the PC 200 to a departure of the automatic printed material delivery apparatus 300 for delivery according to a first exemplary embodiment. Further, FIG. 12B is a diagram illustrating an example of a procedure from an arrival of the automatic printed material delivery apparatus 300 at a destination to recording of a delivery log according to the first exemplary embodiment.

As illustrated in FIG. 12A, first, in response to a request user AAA performing a print operation on the PC 200, the PC 200 transmits a print job to an apparatus that performs printing, i.e., the image forming apparatus 100, (steps S101 to S119 in FIG. 9). The image forming apparatus 100 received job data transmitted from the PC 200 outputs a printed material and transmits a delivery request to the automatic printed material delivery apparatus 300 (steps S201 to S211 in FIG. 10). The automatic printed material delivery apparatus 300 received the delivery request from the image forming apparatus 100 receives the printed material output by the image forming apparatus 100 and delivers the printed material (steps S301 to S305 in FIG. 11).

The foregoing processes will be described below with reference to flowcharts in FIGS. 9A and 9B, 10, and 11.

Figure 9A:
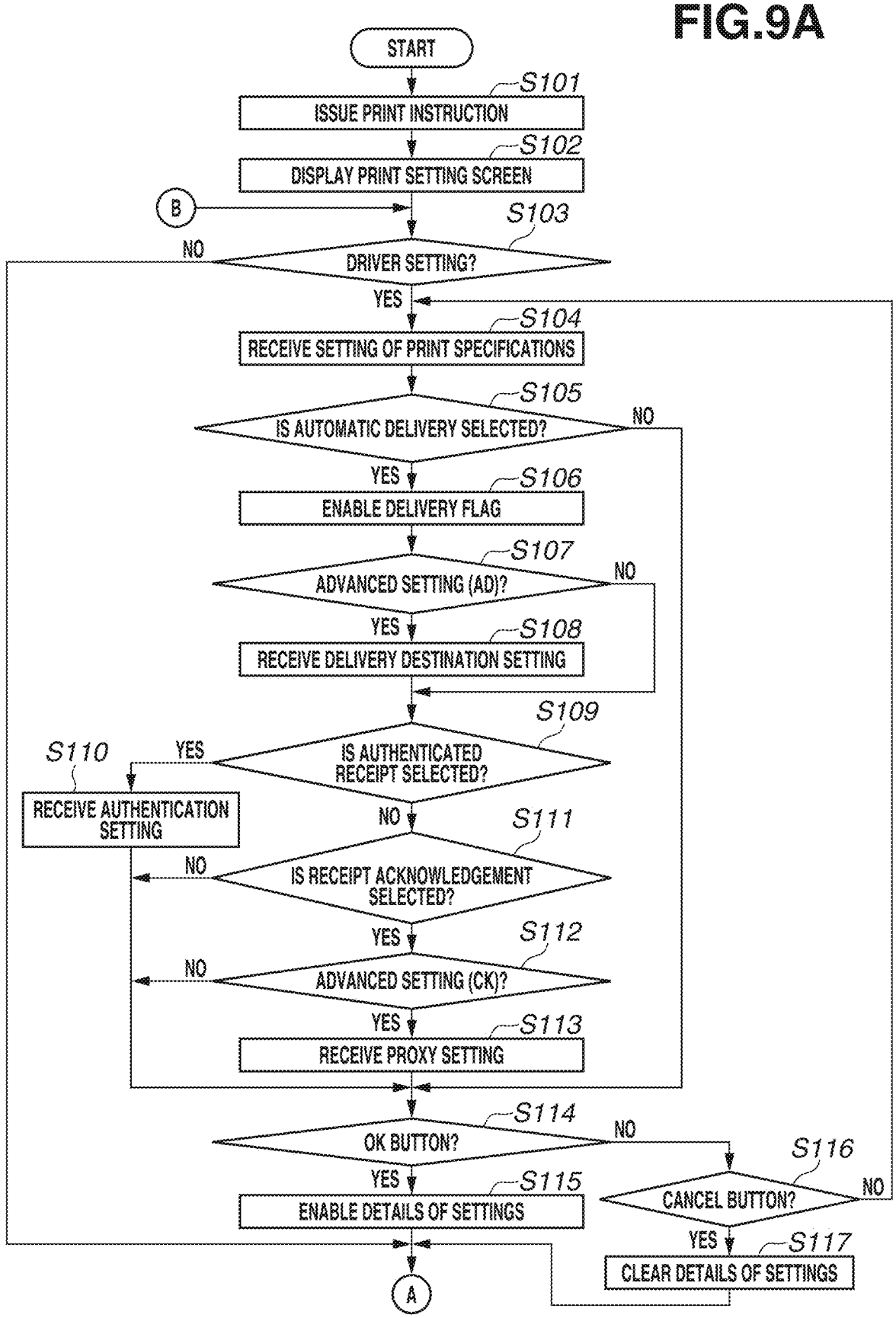
FIGS. 9A and 9B are flowcharts illustrating a process that is performed in a personal computer (PC) according to the first exemplary embodiment.
Figure 9B:
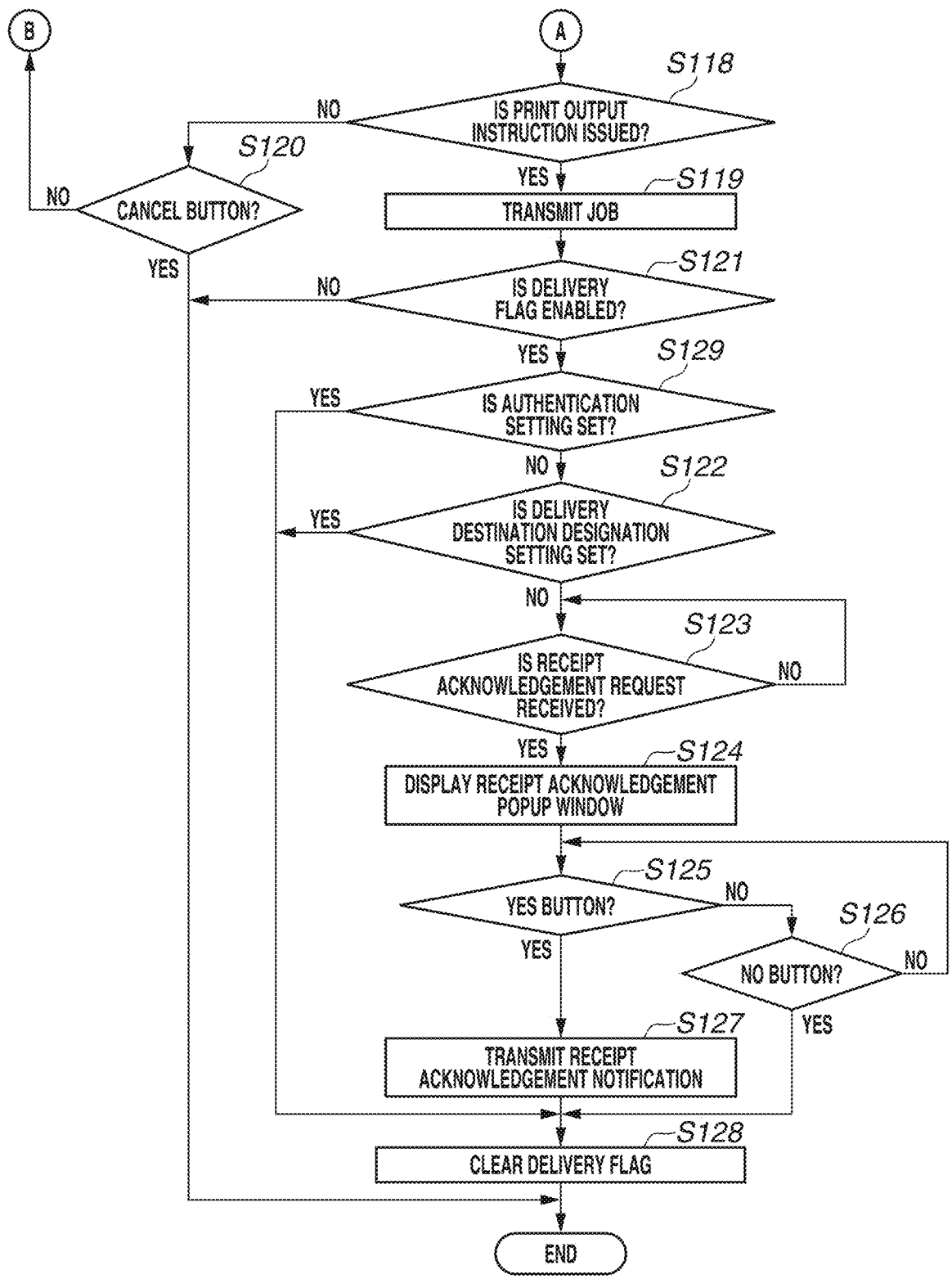

FIGS. 9A and 9B are flowcharts illustrating the process in the PC 200 based on operations performed by the request user AAA according to the first exemplary embodiment. The process in the flowcharts is realized by a CPU (not illustrated) of the PC 200 by executing a program such as an application or a printer driver.

Figure 10:
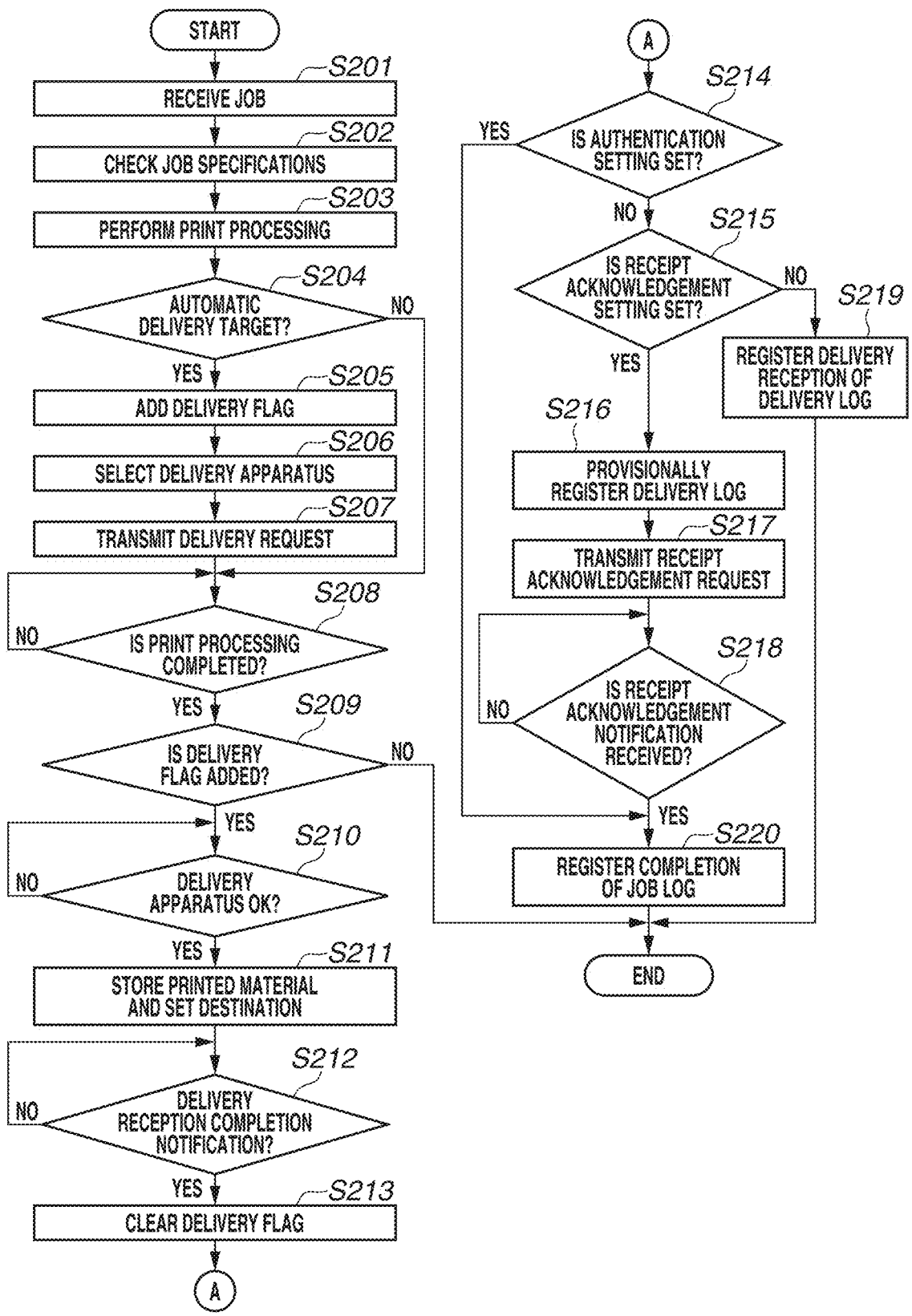
FIG. 10 is a flowchart illustrating a process that is performed in the image forming apparatus according to the first exemplary embodiment.

FIG. 10 is a flowchart illustrating the process in the image forming apparatus 100 according to the first exemplary embodiment. The process in the flowchart is realized by the CPU 101a of the control unit 101 of the image forming apparatus 100 by reading the program 109a stored in the storage apparatus 109 to the memory 101b and executing the program 109a.

Figure 11:
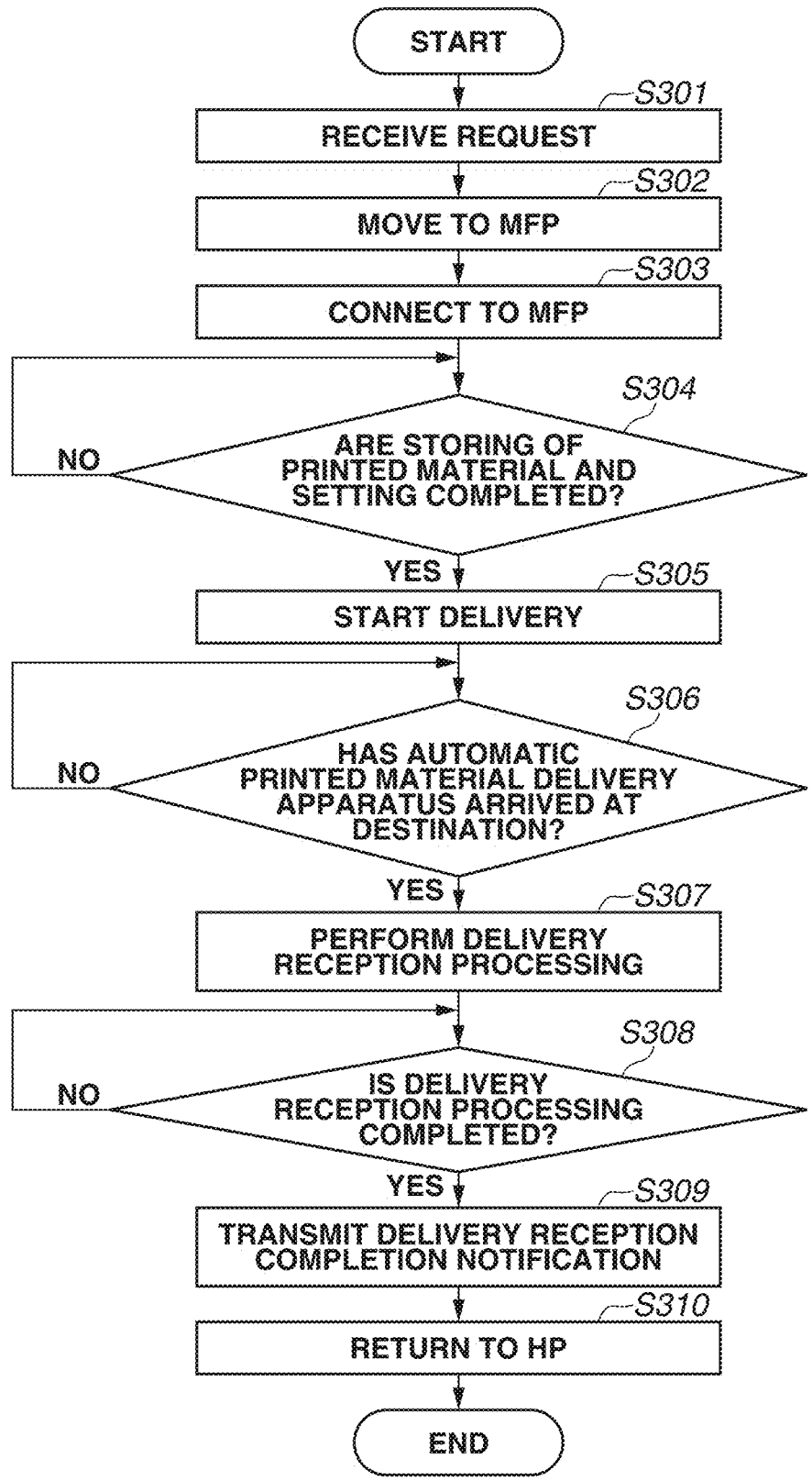
FIG. 11 is a flowchart illustrating a process that is performed in the automatic printed material delivery apparatus according to the first exemplary embodiment.

FIG. 11 is a flowchart illustrating the process in the automatic printed material delivery apparatus 300 according to the first exemplary embodiment. The process in the flowchart is realized by the CPU 303a in the control unit 303 of the automatic printed material delivery apparatus 300 by reading a program, such as an application and a printer driver, stored in the ROM 303*c* to the memory 303*b* and executing the read program.

First, the process in the PC 200 will be described below with reference to FIG. 9.

The request user AAA opens print target data using an application on the PC 200 and performs an operation to issue a print instruction. Hereinafter, when used alone, the term "application" indicates the foregoing application. In step S101, the application receives the print instruction. In step S102, the application displays a print setting screen (not illustrated) of the application or displays a print setting popup window. The displayed print setting screen of the application includes operable controls for selecting an apparatus that performs printing, an advanced setting (printer properties) for the selected apparatus, a print range, the number of copies, and a simple print setting, a print execution button, a cancel button, and the like. In the present exemplary embodiment, the image forming apparatus 100 is selected as an apparatus that performs printing. The application receives operations performed on the controls and performs necessary determination based on the operations (steps S303, S118, and S120).

In step S103, in a case where the request user AAA selects the advanced setting (a printer property) of the apparatus that performs printing, the application determines that a printer driver setting is to be set (YES in step S103), and the application calls a printer driver for the apparatus that performs printing. In the present exemplary embodiment, a case where a printer driver for the image forming apparatus 100 is called will be described below. The printer driver is capable of generating a print job for performing printing with the image forming apparatus 100 and delivering a printed material with the automatic printed material delivery apparatus 300.

The printer driver called in step S103 in response to the selection of the advanced setting (printer property) of the apparatus that performs printing displays a printer driver setting screen 220 as illustrated in FIG. 6 on a display unit of the PC 200. Hereinafter, when used alone, the term "printer driver" indicates the foregoing printer driver.

FIG. 6 is a diagram illustrating an example of the printer driver setting screen 220 according to the present exemplary embodiment.

The request user AAA can set print specifications, such as a size, an orientation, the number of copies, page layout, 1-sided/2-sided, a binding direction, and a color mode, as needed on the printer driver setting screen 220. In step S104, the printer driver receives the setting of the print specifications described above via the printer driver setting screen 220.

In a case where an automatic delivery checkbox 221 on the printer driver setting screen 220 is selected by the user (YES in step S105), the processing proceeds to step S106. In a case where selection of the automatic delivery checkbox 221 is not detected (NO in step S105), the processing proceeds to step S114.

In step S106, the printer driver enables, in addition to an advanced setting (AD) 222, an automatic delivery function using the automatic printed material delivery apparatus 300 and enables a delivery flag.

In step S107, in a case where the user selects the advanced setting (AD) 222 of the automatic delivery (YES in step S107), the processing proceeds to step S108. In step S108, the printer driver receives an advanced setting of a delivery destination (delivery destination designation). This will be described below as a second exemplary embodiment. In the first exemplary embodiment, a case where the advanced setting of the delivery destination is not set will be described below. In a case where selection of the advanced setting (AD) 222 of the automatic delivery is not detected (NO in step S107), the processing proceeds to step S109.

Although not illustrated, the printer driver automatically sets the request user as a delivery destination in a case where the advanced setting (AD) 222 of the delivery destination (delivery destination designation) is not set by the user.

In step S109, in a case where an authenticated receipt checkbox 223 is selected by the user (YES in step S109), the processing proceeds to step S110. In step S110, the printer driver receives an authentication setting. This will be described below as a fourth exemplary embodiment. In a case where the authentication setting is received, the processing proceeds to step S114. In the first exemplary embodiment, a case where the authentication setting is not set will be described below. In a case where selection of the authenticated receipt checkbox 223 is not detected (NO in step S109), the processing proceeds to step S11.

In step S111, in a case where a receipt acknowledgement checkbox 225 is selected by the user (YES in step S11), the processing proceeds to step S112. In a case where selection of the receipt acknowledgement checkbox 225 is not detected (NO in step S11), the processing proceeds to step S114.

In step S102, in a case where the user selects advanced setting (CK) 226 of the receipt acknowledgement (YES in step S112), the processing proceeds to step S113. In step S113, the printer driver receives a receipt-acknowledgement-by-proxy setting.

Receiving the receipt-acknowledgement-by-proxy setting will be described below as the third exemplary embodiment. In the first exemplary embodiment, a case where the receipt-acknowledgement-by-proxy setting is not set will be described below. In a case where selection of the advanced setting (CK) 226 of the receipt acknowledgement is not detected (NO in step S112), the processing proceeds to step S114.

In step S114, in a case where the printer driver detects that an OK button 227 on the printer driver setting screen 220 is not selected (NO in step S114), and then in step S116, the printer driver detects that a CANCEL button 228 on the printer driver setting screen 220 is not selected, (NO in step S116), the processing returns to step S104.

In a case where the printer driver detects that the OK button 227 on the printer driver setting screen 220 is selected (YES in step S114), the processing proceeds to step S115. In step S115, the printer driver enables the details of the setting set in and after step S104 and closes the printer driver setting screen 220.

In a case where the printer driver detects that the CANCEL button 228 on the printer driver setting screen 220 is selected (YES in step S116), the processing proceeds to step S117. In step S117, the printer driver clears all the details of the settings set in and after step S104 and closes the printer driver setting screen 220.

Once the printer driver setting screen 220 is closed, the control is returned to the application, and processing in step S118 is performed.

In step S118, in a case where the application detects that the print execution button is not selected (NO in step S118), and then in step S120, the application detects that the cancel button on the print setting screen (not illustrated) of the application is not selected (NO in step S120), the processing returns to step S103.

In a case where the application detects that the cancel button on the print setting screen of the application is selected (YES in step S120), the process in the flowchart is ended.

In a case where the print execution button on the print setting screen of the application is selected, the application determines that a print output instruction is issued (YES in step S118), the processing proceeds to step S119. In step S119, the application transmits a print job to the apparatus that performs printing, i.e., the image forming apparatus 100. The process of the PC 200 thereafter will be described below.

The process in the image forming apparatus 100 will be described below with reference to FIG. 10.

In step S201, the image forming apparatus 100 receives job data transmitted from the PC 200, and the processing proceeds to step S202.

In step S202, the image forming apparatus 100 checks job specifications based on the job data received in step S201. Hereinafter, when used alone, the term "job" indicates the foregoing job.

Next, in step S203, the image forming apparatus 100 starts print processing based on the job specifications.

Next, in step S204, the image forming apparatus 100 checks whether the job is an automatic delivery target. In a case where the job is not an automatic delivery target (NO in step S204), the processing proceeds to step S208.

On the other hand, in a case where the job is an automatic delivery target (YES in step S204), the processing proceeds to step S205.

In step S205, the image forming apparatus 100 adds a delivery flag to the job.

In step S206, the image forming apparatus 100 searches for automatic printed material delivery apparatuses available for use and selects an automatic printed material delivery apparatus. In the present exemplary embodiment, the selected automatic printed material delivery apparatus is the automatic printed material delivery apparatus 300.

In step S207, the image forming apparatus 100 transmits a delivery request to the automatic printed material delivery apparatus 300 selected in step S206, and the processing proceeds to step S208. The process from step S208 will be described below.

The process in the automatic printed material delivery apparatus 300 will be described below with reference to FIG. 11.

In step S301, the automatic printed material delivery apparatus 300 receives the delivery request transmitted from the image forming apparatus 100, and the processing proceeds to step S302.

In step S302, the automatic printed material delivery apparatus 300 moves to the image forming apparatus 100. In step S303, after completing the movement to the image forming apparatus 100, the automatic printed material delivery apparatus 300 connects to the image forming apparatus 100, and the processing proceeds to step S304. The process from step S304 will be described below.

A continuation of the description of the process in the image forming apparatus 100 with reference to FIG. 10 will be described below.

In step S208, the image forming apparatus 100 waits for completion of the print processing of the job that is started in step S202. In a case where the print processing is completed (YES in step S208), the processing proceeds to step S209.

In step S209, the image forming apparatus 100 checks whether a delivery flag is added to the job. In a case where no delivery flag is added to the job (NO in step S209), the process in the flowchart is ended.

On the other hand, in a case where a delivery flag is added to the job (YES in step S209), the processing proceeds to step S210.

In step S210, the image forming apparatus 100 waits for the automatic printed material delivery apparatus 300 to be in a delivery apparatus OK state in which the automatic printed material delivery apparatus 300 is connected to the image forming apparatus 100. Then, in a case where the automatic printed material delivery apparatus 300 changes to the delivery apparatus OK state (YES in step S210), the processing proceeds to step S211.

In step S211, the image forming apparatus 100 stores the printed material of the job in the collection unit 306 of the automatic printed material delivery apparatus 300 and sets information for use in delivery, such as a destination (delivery destination address) to the automatic printed material delivery apparatus 300.

In step S212, the image forming apparatus 100 waits for a delivery reception completion notification from the automatic printed material delivery apparatus 300. The process from step S212 will be described below.

A continuation of the description of the process in the automatic printed material delivery apparatus 300 with reference to FIG. 11 will be described below.

In step S304, the automatic printed material delivery apparatus 300 waits for the image forming apparatus 100 to complete storing of the delivery target printed material and a necessary setting for the delivery. Then, in a case where the automatic printed material delivery apparatus 300 determines that the storing of the printed material and the setting are completed (YES in step S304), the processing proceeds to step S305. In a case where the automatic printed material delivery apparatus 300 determines that the storing of the printed material and the setting are not completed (NO in step S304), the processing returns to step S304.

In step S305, the automatic printed material delivery apparatus 300 starts moving to the delivery destination.

In step S306, the automatic printed material delivery apparatus 300 determines whether the automatic printed material delivery apparatus 300 arrives at the destination. In a case where the automatic printed material delivery apparatus 300 determines that the automatic printed material delivery apparatus 300 has arrived at the destination (YES in step S306), the processing proceeds to step S307. In a case where the automatic printed material delivery apparatus 300 determines that the automatic printed material delivery apparatus 300 has not arrived at the destination (NO in step S306), the processing returns to step S306. A procedure from the arrival of the automatic printed material delivery apparatus 300 at the destination to recording of a delivery log as illustrated in FIG. 12B will be described below.

In step S307, the automatic printed material delivery apparatus 300 performs delivery reception processing of the printed material. As described above, the delivery reception processing varies in accordance with the specifications of the automatic printed material delivery apparatus 300. For example, in a case where the automatic printed material delivery apparatus 300 is configured to discharge a printed material using an arm, the delivery reception processing is completed by passing the printed material directly to the user at the destination using the arm or by placing the printed material on a designated target desk using the arm. Further, in a case where the automatic printed material delivery apparatus 300 has no arms and the collection unit 306 and the discharge unit 307 are a tray or a box with a printed material detection sensor, completion of the delivery reception processing is detected based on detection of removal of a printed material by the printed material detection sensor. In a case where the setting completed in step S304 includes the authentication setting, the automatic printed material delivery apparatus 300 performs authentication as described above and performs controls to be ready for passing of the printed material.

Next, in step S308, the automatic printed material delivery apparatus 300 determines whether the delivery reception processing of the printed material is completed. In a case where the automatic printed material delivery apparatus 300 determines that the delivery reception processing of the printed material is completed (YES in step S308), the processing proceeds to step S309. In a case where the automatic printed material delivery apparatus 300 determines that the delivery reception processing of the printed material is not completed (NO in step S308), the processing returns to step S308.

In step S309, the automatic printed material delivery apparatus 300 transmits a delivery reception completion notification to the image forming apparatus 100.

In step S310, the automatic printed material delivery apparatus 300 moves (returns) to a home position (HP), and the process in the flowchart is ended.

A continuation of the description of the process in the image forming apparatus 100 with reference to FIG. 10 will be described below.

In step S212, in a case where the automatic printed material delivery apparatus 300 starts delivery, the image forming apparatus 100 waits for a delivery reception completion notification from the automatic printed material delivery apparatus 300. Then, in a case where a delivery reception completion notification is received from the automatic printed material delivery apparatus 300 (YES in step S212), the processing proceeds to step S213. In a case where a delivery reception completion notification is not received from the automatic printed material delivery apparatus 300 (NO in step S212), the processing returns to step S212.

In step S213, the image forming apparatus 100 clears the delivery flag added to the job.

Next, in step S214, the image forming apparatus 100 determines whether an authenticated receipt setting is set for the job. In a case where the authenticated receipt setting is set (YES in step S214), the processing proceeds to step S220. The case where the authenticated receipt setting is set will be described below as the fourth exemplary embodiment.

In a case where the authenticated receipt setting is not set (NO in step S214), the processing proceeds to step S215.

In step S215, the image forming apparatus 100 determines whether a receipt acknowledgement setting is set for the job. In a case where the receipt acknowledgement setting is not set (NO in step S215), the processing proceeds to step S219.

In step S219, the image forming apparatus 100 registers a delivery log of the delivery in a job log management table 110 illustrated in FIGS. 7A and 7B (details thereof will be described below). After step S219, the process in the flowchart is ended.

On the other hand, in a case where the receipt acknowledgement setting is set (YES in step S215), the processing proceeds to step S216.

In step S216, the image forming apparatus 100 provisionally registers a delivery log in the job log management table 110. In the case of the provisional registration, for example, a delivery log is provisionally registered in the job log management table 110 as in "NO. 4" in FIG. 7A. In the provisionally-registered state, since the receipt acknowledgement is uncompleted, the delivery log is registered with a recipient identifier (ID) "?" and a delivery status "delivery completed (unacknowledged)". Further, since the case described herein is a case where the advanced setting of the delivery destination (step S108 in FIG. 9) is not set and the request user is automatically set as a delivery destination, "AAA", which is an ID of the request user AAA, is recorded in a delivery destination ID. A date/time timestamp of the provisional registration is recorded in a field of date and time.

The job log management table 110 will be described below with reference to FIGS. 7A and 7B.

FIGS. 7A and 7B are diagrams illustrating the job log management table 110 stored in the storage apparatus 109 by the image forming apparatus 100 according to the first exemplary embodiment.

In a conventional job log, items of a management number, the date and time, a job name, and a print processing state are managed. In addition to the foregoing items, items of a delivery destination ID, a recipient ID, and a delivery status are also managed in the job log management table 110 according to the present exemplary embodiment.

In the delivery destination ID in the job log management table 110, an ID of the delivery destination user set in steps S107 and S108 in FIG. 9 is stored. In a case where no delivery destination is set, the ID of the request user is stored. In the recipient ID, an ID of a user acknowledged the receipt is stored in a case where the receipt acknowledgement setting is set in step S111 in FIG. 9. In the delivery status, one of "preparing for delivery", "delivering", "delivery completed", "delivery completed (unacknowledged)", and "delivery completed (received)" is stored. The "delivery completed" is a status of a case where the receipt acknowledgement setting is not set, which is a case of "NO. 2". A status in a case where the receipt acknowledgement setting is set is the "delivery completed (unacknowledged)", which is a case of "NO. 4", or the "delivery completed (received)", which is a case of "NO. 3".

In a case where the automatic delivery setting is "disabled", "-" is recorded in the delivery destination ID, the recipient ID, and the delivery status, which is a case of "NO. 1".

In a case where the automatic delivery setting is "enabled" and the receipt acknowledgement setting is "disabled", "-" is recorded in the recipient ID, which is a case of "NO. 2".

Thus, in a case where the receipt acknowledgement checkbox 225 is not selected in step S109 in FIG. 9, the receipt acknowledgement setting is disabled in step S215 (NO in step S215) in FIG. 10. Thus, in step S219 in FIG. 10, "-" is recorded in the receipt ID and the receipt acknowledgement in the job log management table 110 as in "NO. 2".

Further, in the field of the date and time, a timestamp of receipt of a delivery reception completion notification is recorded.

A continuation of the description of FIG. 10 will be described below.

In step S217 in FIG. 10, the image forming apparatus 100 transmits a receipt acknowledgement request to a PC (the PC 200 herein) of a delivery destination user (the request user AAA is automatically set as the delivery destination user according to the first exemplary embodiment). In step S218, after the transmission of the receipt acknowledgement request, the image forming apparatus 100 waits until a receipt acknowledgement notification from the PC 200 is received. The process from step S218 will be described below.

Information that associates users with PCs can be managed in advance by the image forming apparatus 100 or can be managed by a server on a network. Information that associates users with PCs can be generated based on information about user logins to PCs and managed or can be registered in advance.

A continuation of the description of the process in the PC 200 with reference to FIGS. 9A and 9B will be described below.

After transmitting the job to the image forming apparatus 100, based on the instruction from the application in step S119, the printer driver performs the process from step S121.

In step S121, the printer driver determines whether the delivery flag is enabled. In a case where the delivery flag is disabled (NO in step S121), no automatic delivery will be performed, so that the process in the flowchart is ended.

On the other hand, in a case where the delivery flag is enabled (YES in step S121), the processing proceeds to step S129.

In step S129, the printer driver determines whether the authentication setting is set for the job. In a case where the authentication setting is set for the job (YES in step S129), the processing proceeds to step S128. Details of this case will be described below as the fourth exemplary embodiment.

On the other hand, in a case where the authentication setting is not set for the job (NO in step S129), the processing proceeds to step S122.

In step S122, the printer driver determines whether the delivery destination designation setting (the setting in step S108 described above) is set for the job. In a case where the delivery destination designation setting is set for the job (YES in step S122), the processing proceeds to step S128.

Details of this case will be described below as the second exemplary embodiment.

On the other hand, in a case where the delivery destination designation setting is not set for the job (NO in step S122), the processing proceeds to step S123.

In step S123, the printer driver waits for a receipt acknowledgement request which is an acknowledgement of receipt of the printed material and is transmitted from the image forming apparatus 100. Then, in a case where a receipt acknowledgement request is received (YES in step S123), the processing proceeds to step S124. In step S124, the printer driver displays a receipt acknowledgement popup window 230 as illustrated in FIG. 8 on the display unit of the PC 200 and receives a user operation on the receipt acknowledgement popup window 230.

Figure 8:
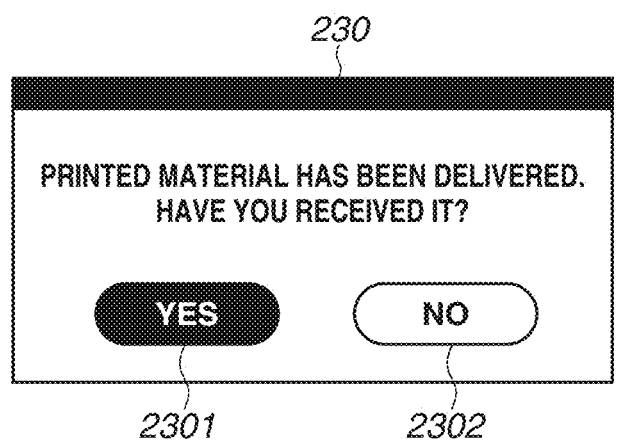
FIG. 8 is a receipt acknowledgement popup window according to the first exemplary embodiment.

FIG. 8 is a diagram illustrating an example of the receipt acknowledgement popup window 230 according to the first exemplary embodiment.

Next, in steps S125 and S126, the printer driver waits for the request user AAA to select a YES button 2301 or a NO button 2302 on the receipt acknowledgement popup window 230.

In a case where the YES button 2301 is selected by the request user AAA (YES in step S125), the processing proceeds to step S127.

In step S127, the printer driver transmits a receipt acknowledgement notification to the image forming apparatus 100 and closes the receipt acknowledgement popup window 230, and the processing proceeds to step S128.

On the other hand, in a case where the NO button 2302 is selected by the request user AAA (NO in step S125 and YES in step S126), the printer driver closes the receipt acknowledgement popup window 230, and the processing proceeds to step S128.

In step S128, the printer driver clears the delivery flag of the job, and the process in the PC 200 that is illustrated in the flowchart is ended.

A continuation of the description of the process in the image forming apparatus 100 with reference to FIG. 10 will be described below.

In step S218, the image forming apparatus 100 waits for the receipt acknowledgement notification (transmitted in step S127 in FIG. 9) from the PC 200. Then, in a case where the receipt acknowledgement notification is received (YES in step S218), the processing proceeds to step S220.

In step S220, the image forming apparatus 100 changes the recipient ID to "AAA" and the delivery status to "delivery completed (received)" in the job log management table 110 as in "NO. 4" in FIG. 7B. Further, the image forming apparatus 100 updates the date and time to a timestamp of receipt of the receipt acknowledgement notification. Then, after the processing in step S220, the process in the image forming apparatus 100 that is illustrated in the flowchart is ended.

In the case where the NO button 2302 on the receipt acknowledgement popup window 230 is pressed, the PC 200 does not transmit a receipt acknowledgement notification. Thus, although not illustrated, the process in the flowchart is ended due to a timeout. In this case, the job log management table 110 is maintained in the state as illustrated in FIG. 7A.

By performing the above-described processes, information about whether a printed material has been delivered to a request user of the printing is recorded as a delivery log.

A case where a user selects the advanced setting (AD) 222 of the automatic delivery on the printer driver setting screen 220 and designates a delivery destination according to the second exemplary embodiment will be described below.

Operations of printing data, generated by the user using the PC 200, with a delivery destination designated using the image forming apparatus 100, delivering a printed material to the designated user, and recording a delivery log after the designated user acknowledges receipt of the printed material will be described below with reference to FIGS. 13 to 16.

Figure 14A:
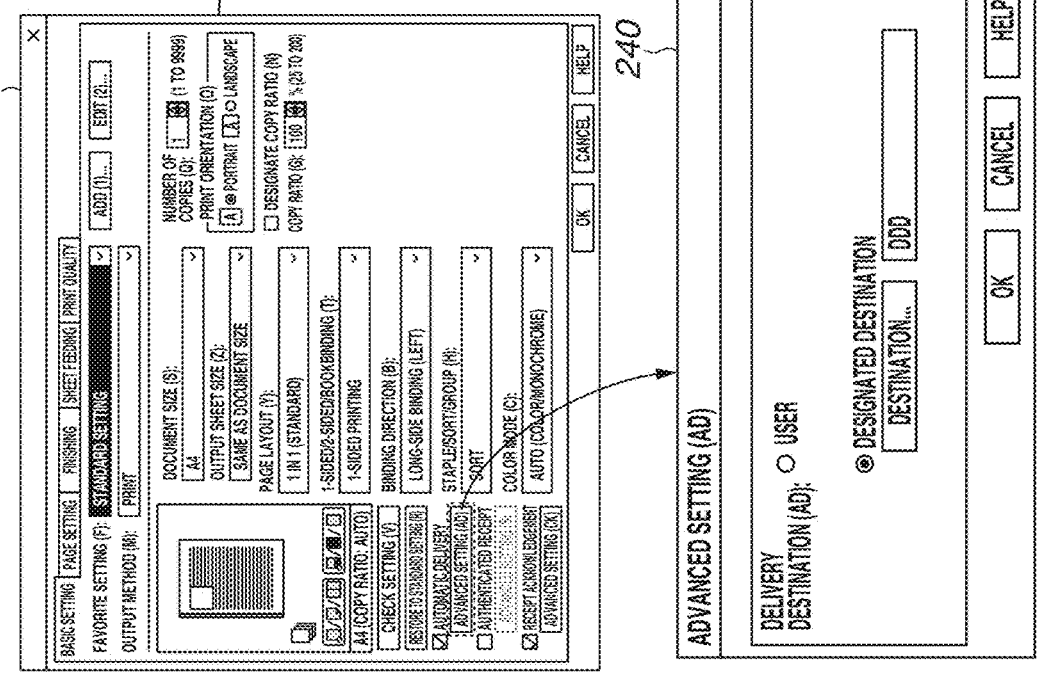
FIG. 14A is a diagram illustrating a procedure from an operation on the PC to a departure of the automatic printed material delivery apparatus for delivery according to the second exemplary embodiment.
Figure 14B:
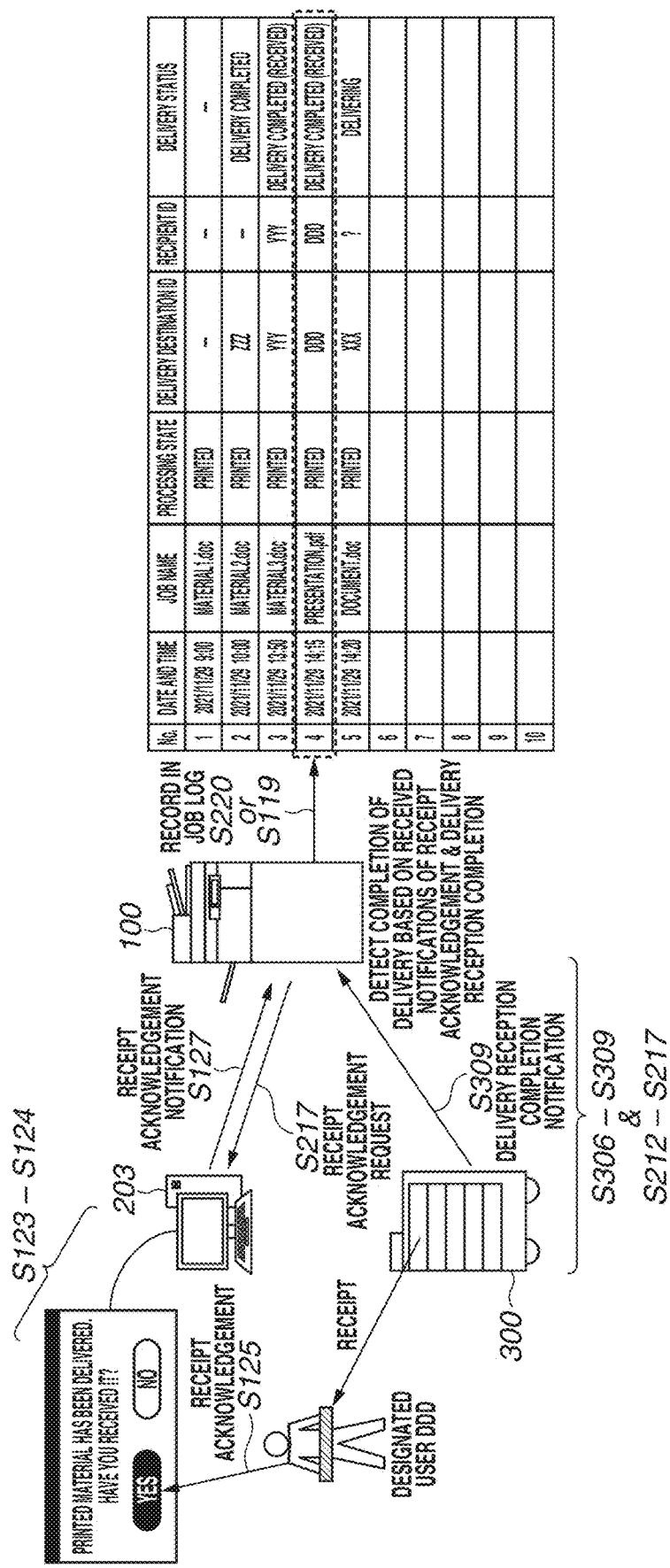
FIG. 14B is a diagram illustrating a procedure from an arrival of the automatic printed material delivery apparatus at a destination to recording of a delivery log according to the second exemplary embodiment.

FIG. 14A is a diagram illustrating an example of a procedure from an operation on the PC 200 to a departure of the automatic printed material delivery apparatus 300 for delivery according to the second exemplary embodiment. FIG. 14B is a diagram illustrating an example of a procedure from an arrival of the automatic printed material delivery apparatus 300 at the destination to recording of a delivery log according to the second exemplary embodiment.

As illustrated in FIG. 14A, first, in response to the request user AAA performing a print operation including delivery destination designation on the PC 200, the PC 200 transmits a print job to an apparatus that performs printing, which is the image forming apparatus 100 herein, (steps S101 to S119 in FIGS. 9A and 9B). The image forming apparatus 100 received job data transmitted from the PC 200 outputs a printed material and transmits a delivery request to the automatic printed material delivery apparatus 300 (steps S201 to S211 in FIG. 10). The automatic printed material delivery apparatus 300 received the delivery request from the image forming apparatus 100 receives the printed material output by the image forming apparatus 100 and delivers the printed material to the designated user (steps S301 to S305 in FIG. 11).

The foregoing processes will be described below with reference to FIGS. 9A and 9B, 10, and 11.

First, the process in the PC 200 will be described below with reference to FIG. 9. Redundant descriptions of steps similar to those according to the first exemplary embodiment are omitted.

In a case where the user selects the advanced setting (AD) 222 of the automatic delivery (YES in step S107), the processing proceeds to step S108.

Figure 13:
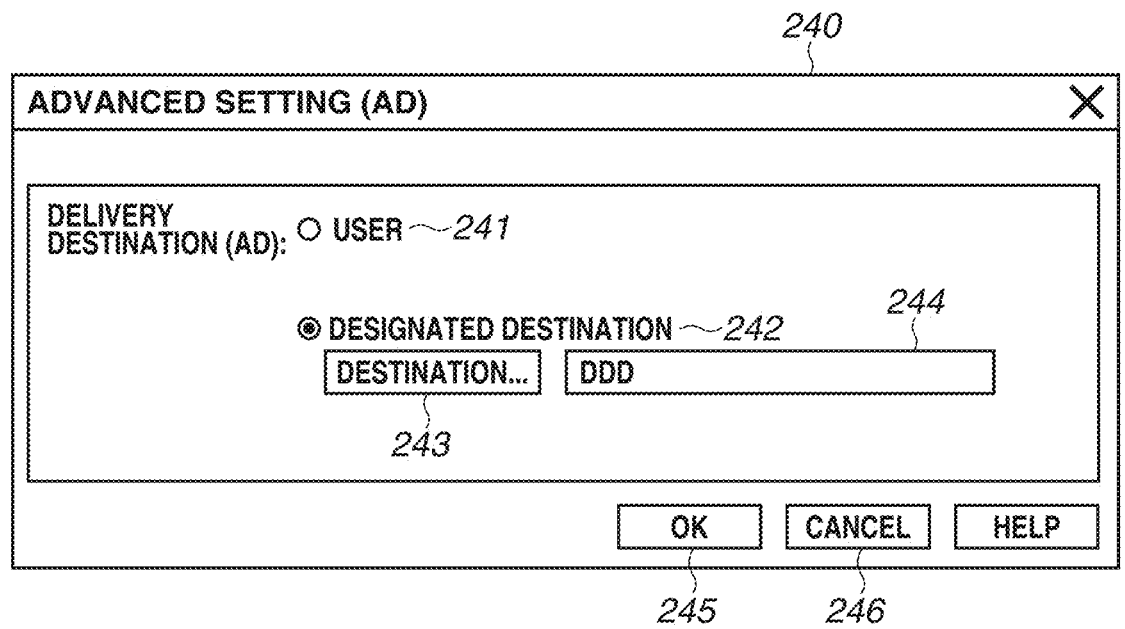
FIG. 13 is a diagram illustrating a delivery destination setting popup screen according to a second exemplary embodiment.

In step S108, the printer driver displays a popup window 240 for the advanced setting (AD) of the automatic delivery as illustrated in FIG. 13 and receives an advanced setting of a delivery destination (delivery destination designation).

FIG. 13 is a diagram illustrating an example of a popup screen, on which a delivery destination is designated, provided by the printer driver operating on the PC 200 according to the second exemplary embodiment.

On the popup window 240 for the advanced setting (AD), a user 241 is set as a default delivery destination. In a case where the user selects a designated destination 242 and presses a DESTINATION button 243, a search window (not illustrated) is displayed. In a case where the user searches for a delivery destination on the search window and finalizes the delivery destination, the finalized delivery destination is reflected in a destination field 244. In a case where an OK button 245 is pressed, the details of the setting on the popup window 240 for the advanced setting (AD) are reflected, and the popup window 240 for the advanced setting (AD) is closed. In a case where a CANCEL button 246 is pressed, the details of the setting on the popup window 240 are discarded, and the popup window 240 is closed. A case where a designated user DDD is set as a designated delivery destination as illustrated in FIG. 13 will be described below.

Steps S109 to S119 in FIGS. 9A and 9B, steps S201 to S211 in FIG. 10, and steps S301 to S303 in FIG. 11 are similar to those according to the first exemplary embodiment, and the redundant descriptions are omitted.

In a case where the designated user DDD is set as a printed material delivery destination, the designated user DDD is set as a delivery destination address in a delivery setting (step S304 in FIG. 11) after the automatic printed material delivery apparatus 300 connects to the image forming apparatus 100.

Further, steps S304 to S310 in FIG. 11 and steps S212 to S215 in FIG. 10 are similar to those according to the first exemplary embodiment, and the redundant descriptions are omitted.

In step S216 in FIG. 10, the image forming apparatus 100 provisionally registers a delivery log in the job log management table 110. In the case of the provisional registration, for example, a delivery log is provisionally registered in the job log management table 110 as in "NO. 4" in FIG. 15A. In the provisionally-registered state, since the receipt acknowledgement is uncompleted, the delivery log is registered with a recipient identifier (ID) "?" and a delivery status "delivery completed (unacknowledged)". According to the second exemplary embodiment, because the designated user DDD is designated in the advanced setting of the delivery destination (step S108 in FIG. 9A), "DDD", which is an ID of the designated user DDD, is recorded in the delivery destination ID. Further, a date/time timestamp of the provisional registration is recorded in the field of the time date and time.

FIGS. 15A and 15B are diagrams illustrating the job log management table 110 stored in the storage apparatus 109 by the image forming apparatus 100 according to the second exemplary embodiment.

Next, a procedure from an arrival of the automatic printed material delivery apparatus 300 at the destination to recording of a delivery log as illustrated in FIG. 14B will be described below.

In step S217 in FIG. 10, the image forming apparatus 100 transmits a receipt acknowledgement request to the PC 203 of the designated user DDD. In step S218, after transmission of the receipt acknowledgement request, the image forming apparatus 100 waits for a receipt acknowledgement notification from the PC 203 is received.

In step S122 in FIG. 9B, since the delivery destination (the designated user DDD) is set for the job (YES in step S122), the processing proceeds to step S128.

In step S128, the printer driver clears the delivery flag, and the process in the PC 200 that is illustrated in the flowchart is ended.

Figure 16:
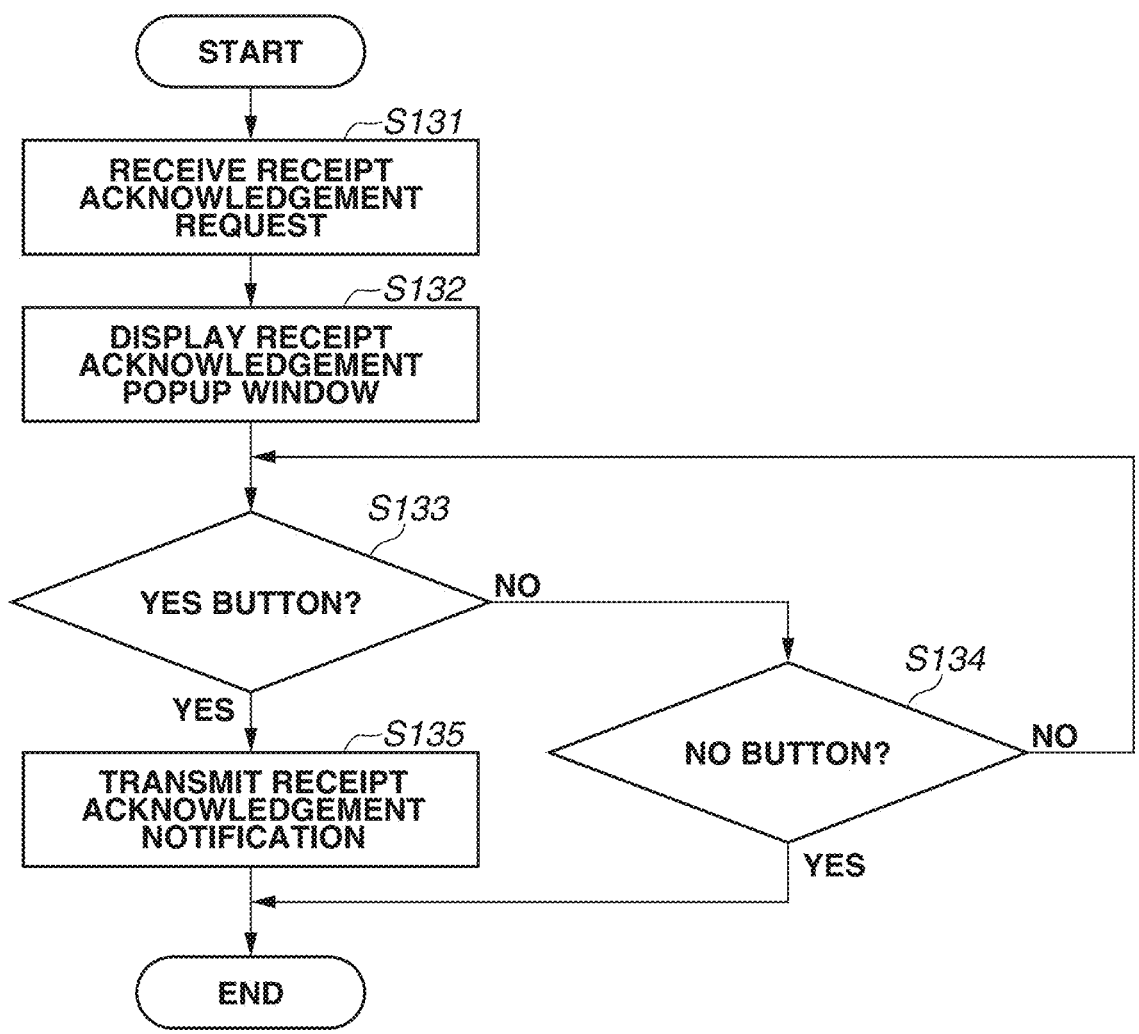
FIG. 16 is a flowchart illustrating a process in a PC of a designated user according to the second exemplary embodiment.

FIG. 16 is a flowchart illustrating a process in the PC 203 of the designated user DDD according to the second exemplary embodiment. The process in the flowchart is realized by a CPU (not illustrated) of the PC 203 executing a program, such as a printer driver.

The PC 203 of the designated user DDD will be described below with reference to FIG. 16.

In step S131, the printer driver on the PC 203 receives the receipt acknowledgement request transmitted from the image forming apparatus 100, and the processing proceeds to step S132.

In step S132, the printer driver displays the receipt acknowledgement popup window 230 as in FIG. 8 on a display unit of the PC 203.

Next, in steps S133 and S134, the printer driver waits for the designated user DDD to select the YES button 2301 or the NO button 2302 on the receipt acknowledgement popup window.

In a case where the YES button 2301 is selected by the designated user DDD (YES in step S133), the processing proceeds to step S135.

In step S135, the printer driver transmits a receipt acknowledgement notification to the image forming apparatus 100 and closes the receipt acknowledgement popup window 230, and the process in the PC 203 that is illustrated in the flowchart is ended.

On the other hand, in a case where the NO button 2302 is selected by the designated user DDD (NO in step S133 and YES in step S134), the printer driver closes the receipt acknowledgement popup window 230, and the process in the PC 203 that is illustrated in the flowchart is ended.

In step S218 in FIG. 10, in a case where the image forming apparatus 100 receives a receipt acknowledgement notification from the PC 203 (YES in step S218), in step S220, the image forming apparatus 100 registers the completion in the job log. In this case, the image forming apparatus 100 changes the recipient ID to "DDD", which is the ID of the designated user DDD, and the delivery status to "delivery completed (received)" in the job log management table 110 as in "NO. 4" in FIG. 15B. Further, the image forming apparatus 100 updates the date and time to a timestamp of the reception of the receipt acknowledgement notification. In the case where the NO button 2302 on the receipt acknowledgement popup window 230 is pressed, the PC 203 does not transmit a receipt acknowledgement notification.

Thus, although not illustrated, the process in the flowchart is ended due to a timeout. In this case, the job log management table 110 is maintained in the state as illustrated in FIG. 15A.

By performing the above-described processes, information about whether a printed material has been delivered to a designated user is recorded as a delivery log.

A case where a user selects the advanced setting (CK) 226 of the receipt acknowledgement on the printer driver setting screen 220 and sets the receipt-acknowledgement-by-proxy setting according to the third exemplary embodiment will be described below.

Operations of printing data, generated by the user using the PC 200, with a proxy setting set using the image forming apparatus 100, delivering a printed material, and recording a delivery log after a proxy (proxy user) acknowledges receipt of the printed material will be described below with reference to FIGS. 17A and 17B to 23.

Figure 17A:
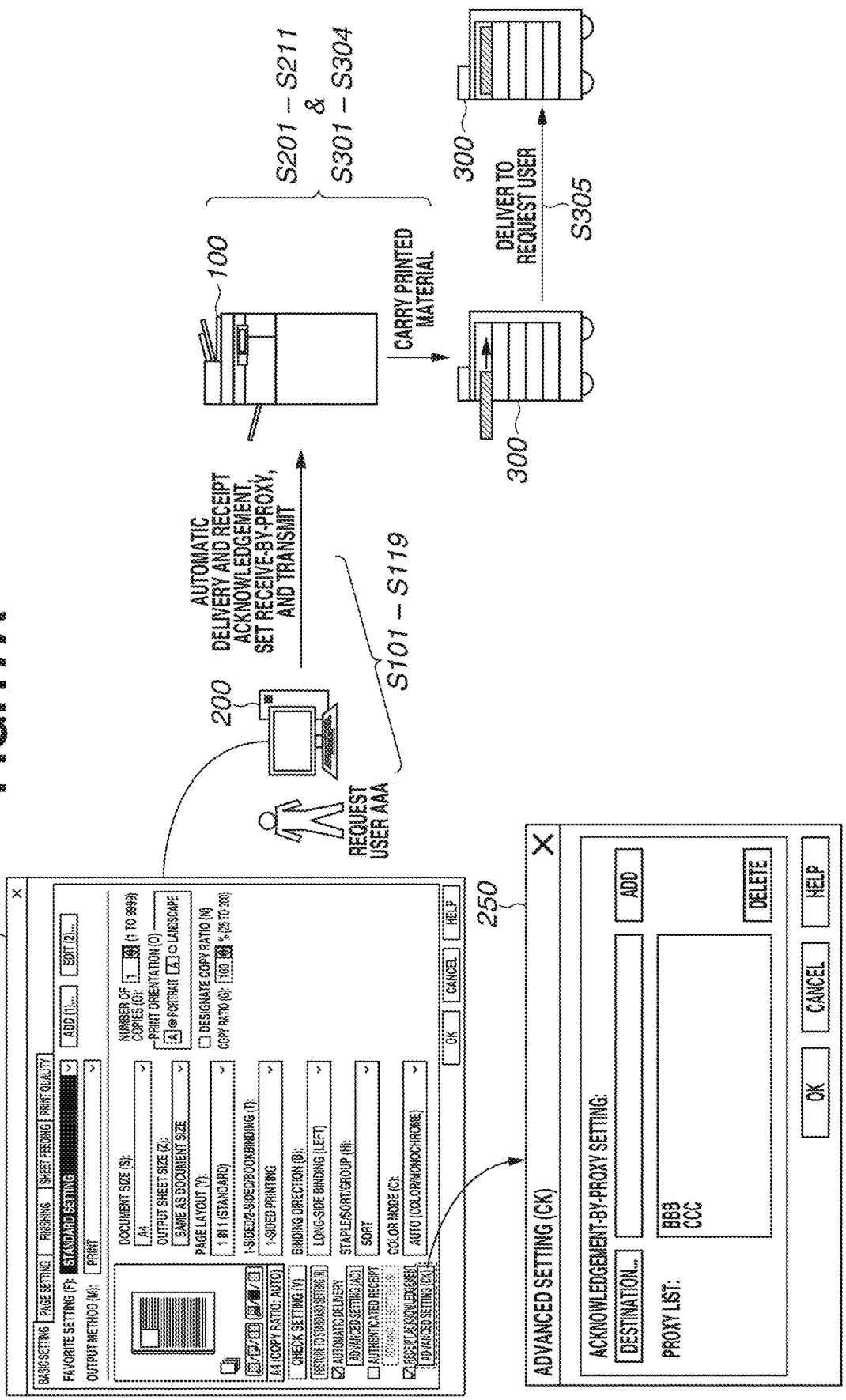
FIG. 17A is a diagram illustrating a procedure from an operation on the PC to a departure of the automatic printed material delivery apparatus for delivery according to a third exemplary embodiment.
Figure 17B:
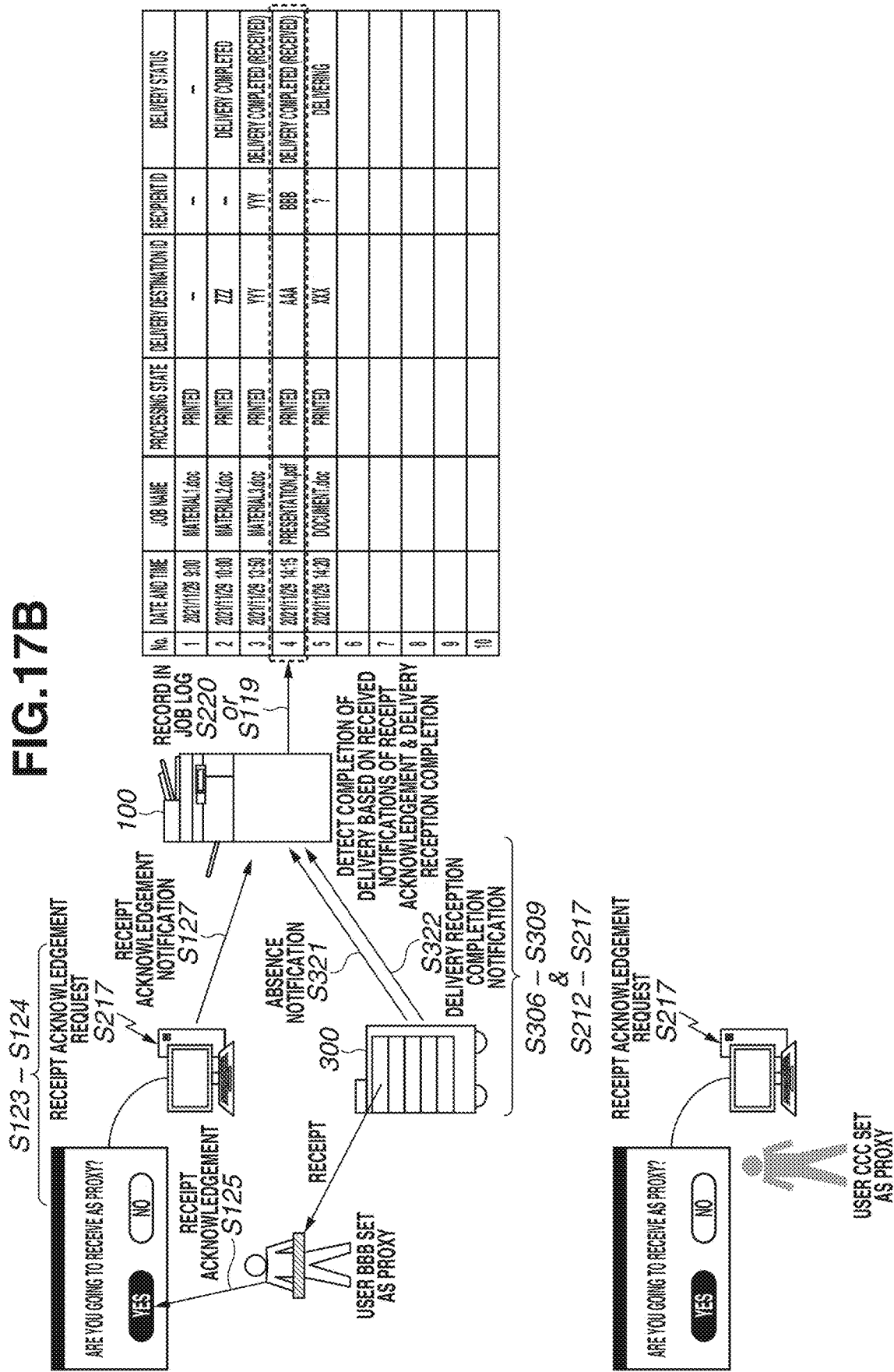
FIG. 17B is a diagram illustrating a procedure from an arrival of the automatic printed material delivery apparatus at a destination to recording of a delivery log according to the third exemplary embodiment.

FIG. 17A is a diagram illustrating an example of a procedure from an operation on the PC 200 to a departure of the automatic printed material delivery apparatus 300 for delivery according to the third exemplary embodiment. FIG. 17B is a diagram illustrating an example of a procedure from an arrival of the automatic printed material delivery apparatus 300 at the destination to recording of a delivery log.

As illustrated in FIG. 17A, first, the request user AAA performs a print operation (including the proxy setting) on the PC 200, and the PC 200 transmits a print job to an apparatus that performs printing, which is the image forming apparatus 100 herein, (steps S101 to S119 in FIG. 9). The image forming apparatus 100 received job data transmitted from the PC 200 outputs a printed material and transmits a delivery request to the automatic printed material delivery apparatus 300 (steps S201 to S211 in FIG. 18). The automatic printed material delivery apparatus 300 received the delivery request from the image forming apparatus 100 receives the printed material output by the image forming apparatus 100 and delivers the printed material to the designated user (steps S301 to S305 in FIG. 19).

The foregoing processes will be described below with reference to FIGS. 9A and 9B, 18, and 19.

First, the process in the PC 200 will be described below with reference to FIGS. 9A and 9B. Redundant descriptions of steps similar to those according to the first exemplary embodiment are omitted.

In a case where the user selects the advanced setting (CK) 226 of the receipt acknowledgement (YES in step S112), the processing proceeds to step S113.

Figure 21:
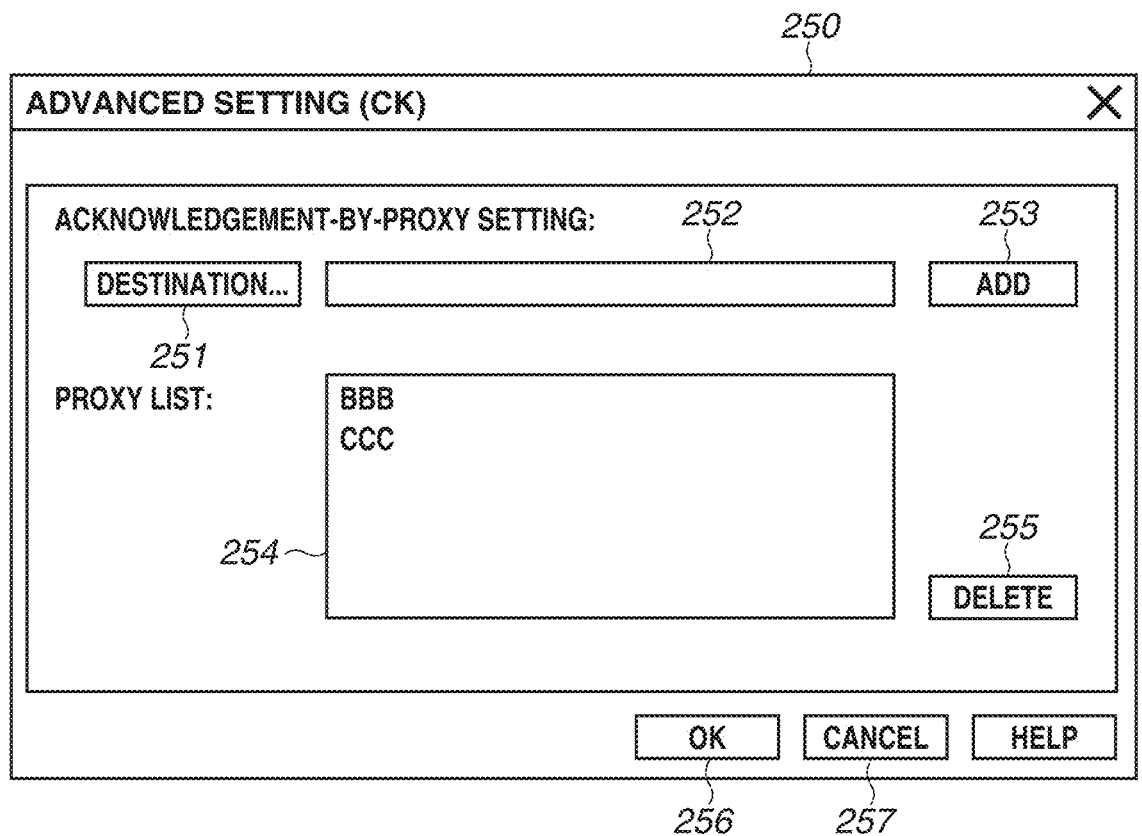
FIG. 21 is a diagram illustrating a receipt-acknowledgement-by-proxy setting popup screen according to the third exemplary embodiment.

In step S113, the printer driver displays a popup window 250 for the advanced setting (CK) 226 of the receipt acknowledgement as illustrated in FIG. 21 and receives the receipt-acknowledgement-by-proxy setting.

FIG. 21 is a diagram illustrating an example of a popup screen, on which the advanced setting of the receipt acknowledgement is set, that is provided by the printer driver operating on the PC 200 according to the third exemplary embodiment.

In a case where the user presses a DESTINATION button 251 on the popup window 250 for the advanced setting of the receipt acknowledgement, a search window (not illustrated) is displayed. In a case where the user searches for a proxy on the search window and finalizes the proxy, the finalized proxy is reflected in a destination section 252. Furthermore, in a case where the user presses an ADD button 253, the proxy is added to a proxy list 254. In a case where a proxy displayed on the proxy list 254 is selected and a DELETE button 255 is pressed, the selected proxy is deleted from the proxy list 254. In a case where an OK button 256 is pressed, the details of the setting on the popup window 250 for the advanced setting of the receipt acknowledgement are reflected, and the popup window 250 is closed.

In a case where a CANCEL button 257 is pressed, the details of the setting on the popup window 250 are discarded, and the popup window 250 is closed.

A case where users BBB and CCC are set as proxies for the receipt acknowledgement as illustrated in FIG. 17A in step S113 in FIG. 9A will be described below. Steps S109 to S119 in FIGS. 9A and 9B are similar to those according to the first exemplary embodiment, and the redundant descriptions are omitted.

Figure 18:
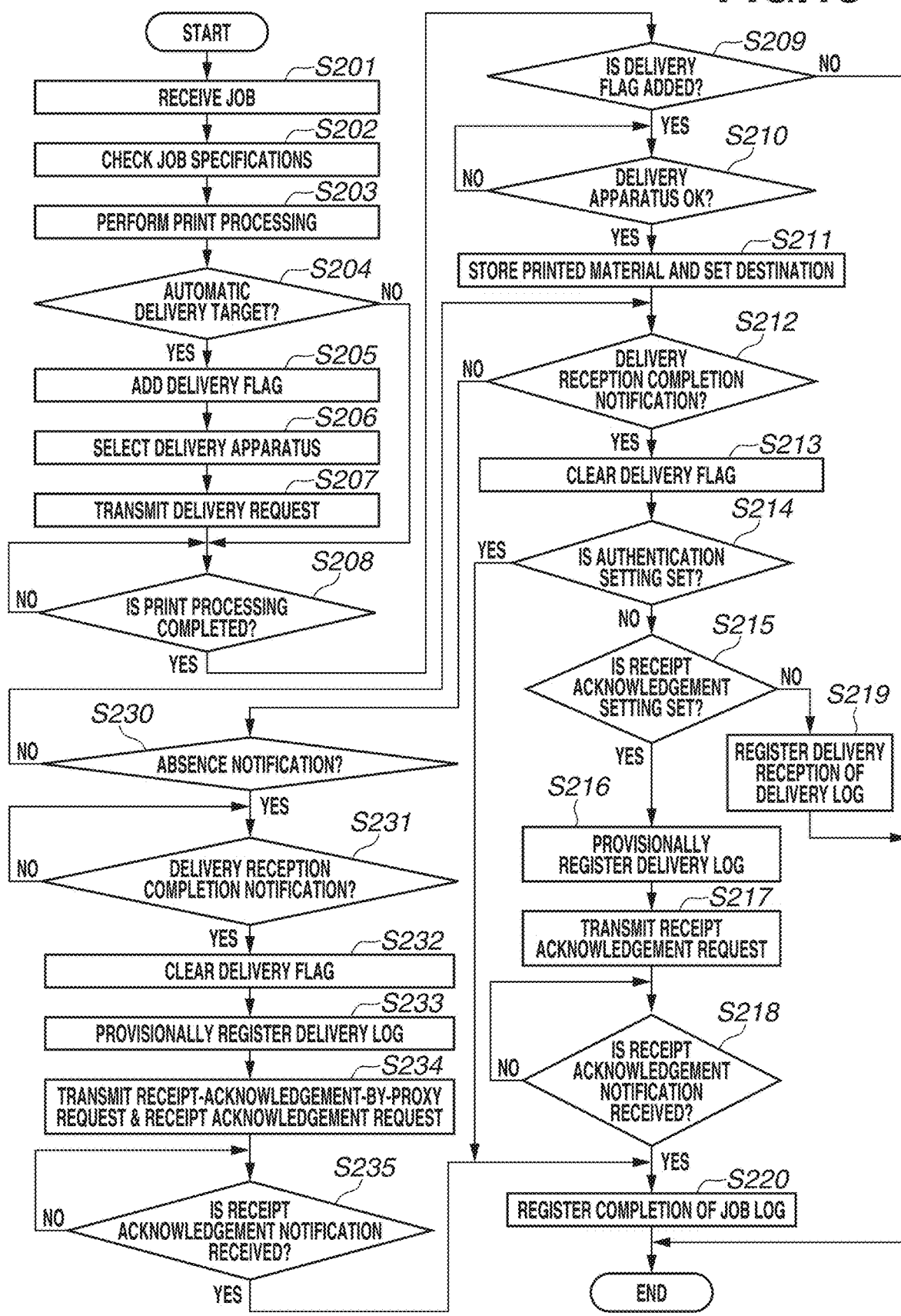
FIG. 18 is a flowchart illustrating a process in the image forming apparatus according to the third exemplary embodiment.

FIG. 18 is a flowchart illustrating the process in the image forming apparatus 100 according to the third exemplary embodiment. In FIG. 18, each step similar to its corresponding step in FIG. 10 is given the same step number as the corresponding step in FIG. 10. The process in the flowchart is realized by the CPU 101a in the control unit 101 of the image forming apparatus 100 executing the program 109a stored in the storage apparatus 109 to the memory 101b and executing the read program 109a. Steps S201 to S211 in FIG. 18 are similar to those according to the first exemplary embodiment, and the redundant descriptions are omitted.

In step S212 in FIG. 18, the image forming apparatus 100 checks whether a delivery reception completion notification is received from the automatic printed material delivery apparatus 300. In a case where no delivery reception completion notification is received (NO in step S212), the processing proceeds to step S230.

In step S230, the image forming apparatus 100 checks whether an absence notification is received from the automatic printed material delivery apparatus 300. In a case where no absence notification is received (NO in step S230), the processing returns to step S212.

In a case where an absence notification is received (YES in step S230), the processing proceeds to step S231. In step S231, the image forming apparatus 100 waits for a delivery reception completion notification from the automatic printed material delivery apparatus 300. Then, in a case where a delivery reception completion notification is received from the automatic printed material delivery apparatus 300 (YES in step S231), the processing proceeds to step S232. In step S232, the image forming apparatus 100 clears the delivery flag. The process from step S233 will be described below.

Next, a procedure from an arrival of the automatic printed material delivery apparatus 300 at the destination to recording of a delivery log as illustrated in FIG. 17B will be described below.

Figure 19:
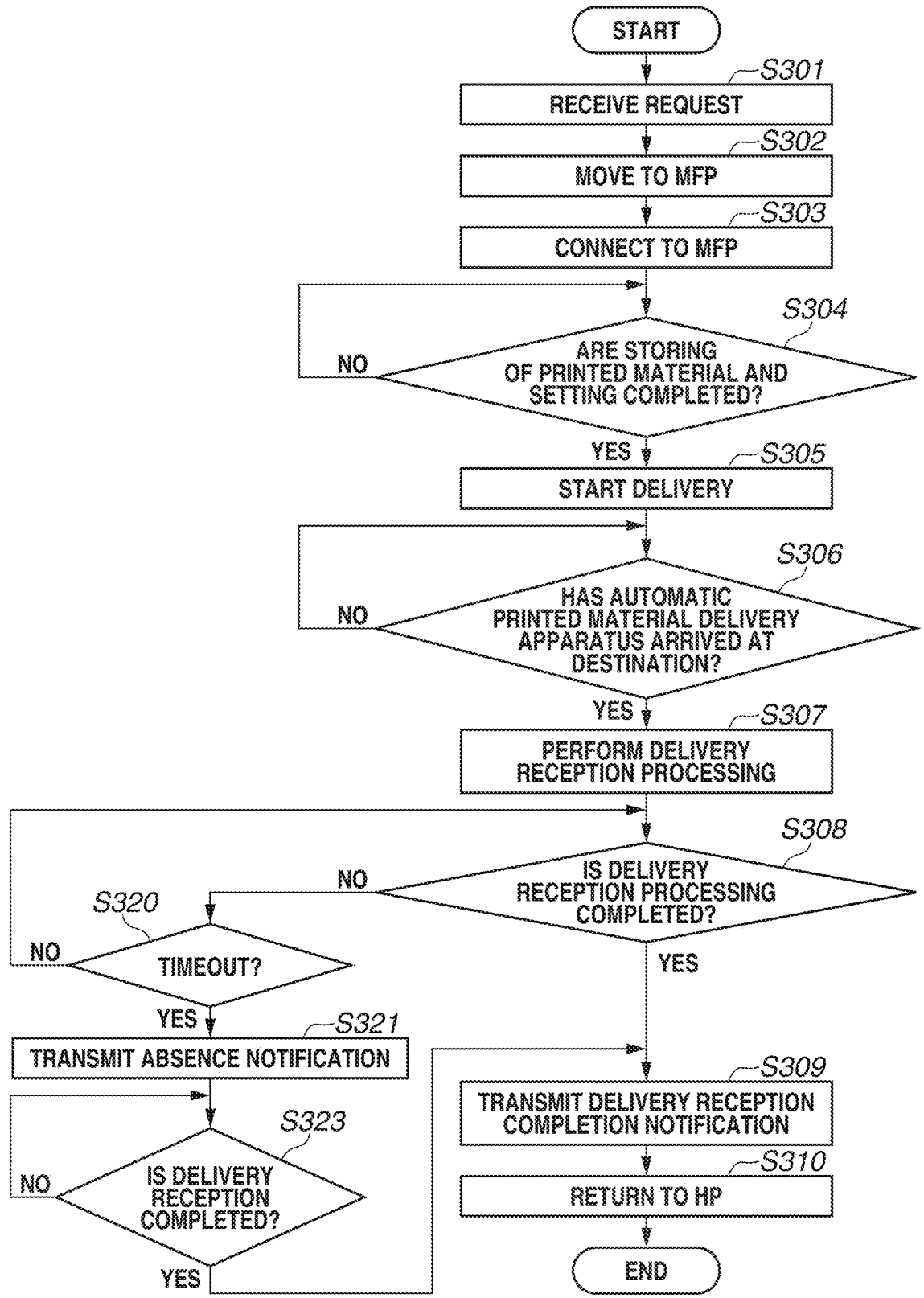
FIG. 19 is a flowchart illustrating a process in the automatic printed material delivery apparatus according to the third exemplary embodiment.

FIG. 19 is a flowchart illustrating the process in the automatic printed material delivery apparatus 300 according to the third exemplary embodiment. In FIG. 19, each step similar to its corresponding step in FIG. 11 is given the same step number as the corresponding step in FIG. 11. The process in the flowchart is realized by the CPU 303a, in the control unit 303 of the automatic printed material delivery apparatus 300, reading a program stored in the ROM 303c to the memory 303b and executing the read program. Steps S301 to S303 in FIG. 19 are similar to those according to the first exemplary embodiment, and the redundant descriptions are omitted.

In step S308 in FIG. 19, in a case where the automatic printed material delivery apparatus 300 successfully detects completion of delivery reception of the printed material (YES in step S308), the processing proceeds to step S309. In step S309, the automatic printed material delivery apparatus 300 transmits a delivery reception completion notification to the image forming apparatus 100.

On the other hand, in a case where the automatic printed material delivery apparatus 300 cannot detect completion of delivery reception of the printed material (NO in step S308), the processing proceeds to step S320.

In step S320, the automatic printed material delivery apparatus 300 monitors a value of a timer, and in a case where the value of the timer exceeds a preset value, the automatic printed material delivery apparatus 300 determines that a timeout has occurred. The automatic printed material delivery apparatus 300 includes a timer function (not illustrated) and starts the timer at an arrival at a destination. Specifically, in a case where completion of delivery reception is not detected before a predetermined time passes from the arrival at the destination, it is determined that a timeout has occurred.

In a case where a timeout has not occurred (NO in step S320), the processing returns to step S308.

On the other hand, in a case where a timeout has occurred (YES in step S320), the processing proceeds to step S321.

In step S321, the automatic printed material delivery apparatus 300 transmits an absence notification to the image forming apparatus 100.

Next, in step S323, the automatic printed material delivery apparatus 300 waits for detection of completion of delivery reception of the printed material. Then, in a case where the automatic printed material delivery apparatus 300 successfully detects completion of delivery reception of the printed material (YES in step S323), the processing proceeds to step S309. In step S309, the automatic printed material delivery apparatus 300 transmits a delivery reception completion notification to the image forming apparatus 100. Step S310 in FIG. 19 is similar to that according to the first exemplary embodiment, and the redundant descriptions are omitted.

The detection of delivery reception herein is performed in response to the user BBB set as a proxy receiving the printed material as illustrated in FIG. 17B.

In step S233 in FIG. 18, the image forming apparatus 100 provisionally registers a delivery log in the job log management table 110 as in "NO. 4" in FIG. 7A. In the provisionally-registered state, since receipt acknowledgement is uncompleted, the delivery log is registered with the recipient ID "?" and the delivery status "receipt completion (unacknowledged)". In a case where the settings in steps S107 and S108 in FIG. 9A are in their default states, the delivery destination ID is "AAA", which is the ID of the request user AAA. In the field of the date and time, a date/time timestamp of the provisional registration is recorded.

Next, in step S234, the image forming apparatus 100 transmits a receipt-acknowledgement-by-proxy request to the PCs 201 and 202 of the users BBB and CCC set as proxies for acknowledging receipt by proxy and transmits a receipt acknowledgement request to the PC 200 of the request user AAA. In step S235, after the transmission, the image forming apparatus 100 waits for a receipt acknowledgement notification.

Figure 20:
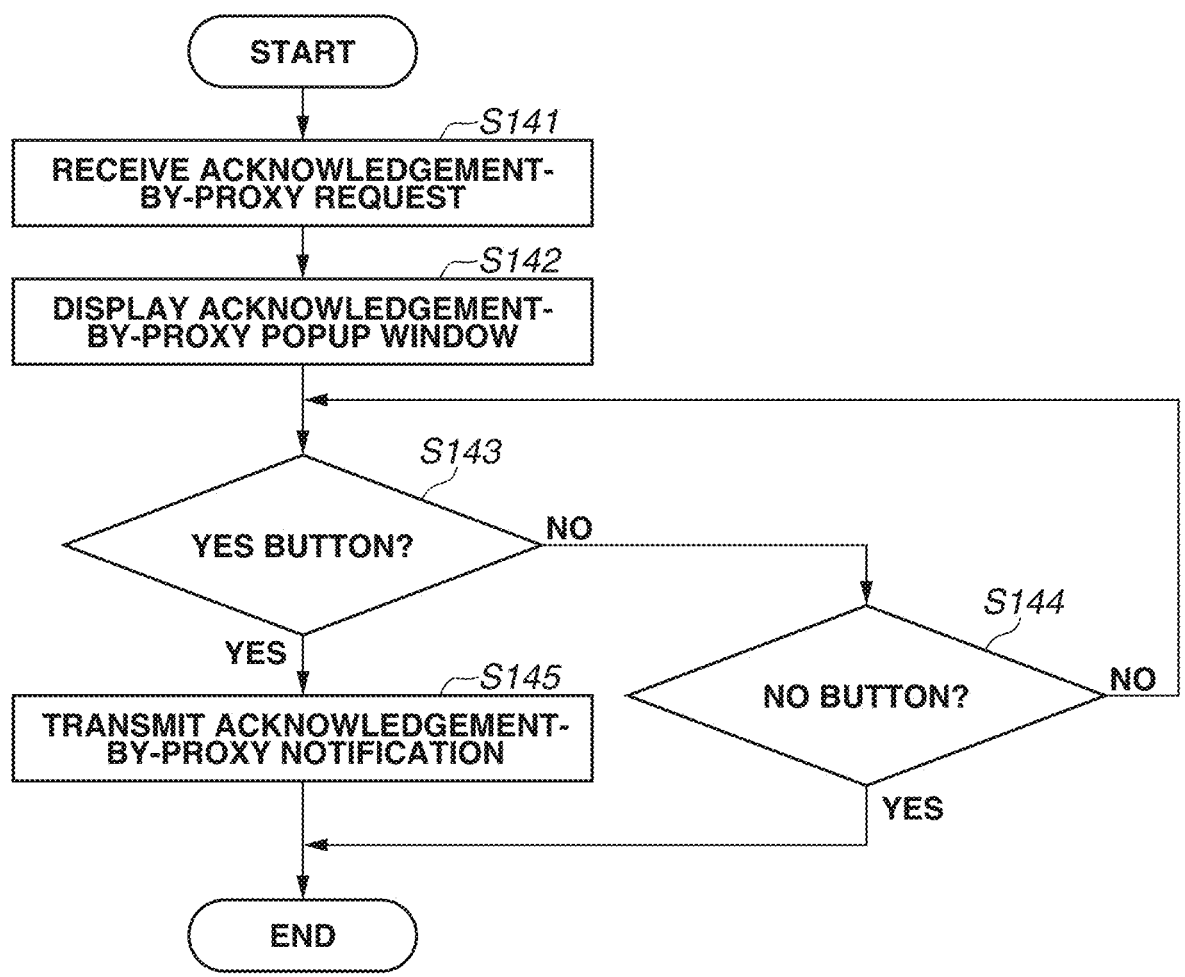
FIG. 20 is a flowchart illustrating a process in a PC of a designated user according to the third exemplary embodiment.

FIG. 20 is a flowchart illustrating a process in the PCs 201 and 202 of the users BBB and CCC set as proxies for acknowledging receipt according to the third exemplary embodiment. The process in the flowchart is realized by CPUs (not illustrated) of the PCs 201 and 202 by executing a program, such as a printer driver.

While the process in the PC 201 will be described below, the same applies to the PC 202.

In step S141, the printer driver of the PC 201 receives the acknowledgement-by-proxy request transmitted from the image forming apparatus 100, and the processing proceeds to step S142.

Figure 22:
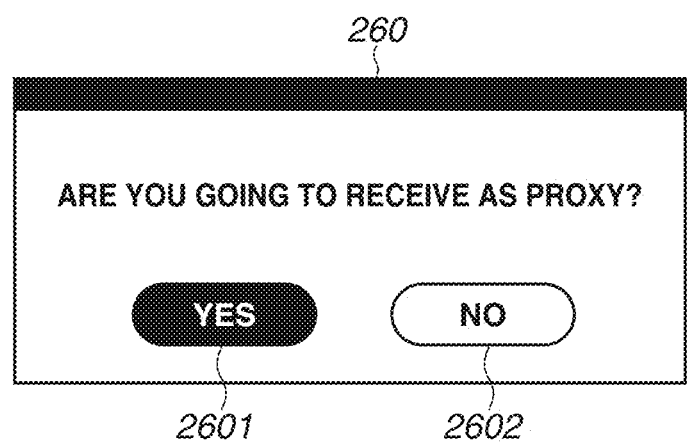
FIG. 22 is a diagram illustrating a delivery completion acknowledgement popup screen according to the third exemplary embodiment.

In step S142, the printer driver displays an acknowledgement-by-proxy popup window 260 as illustrated in FIG. 22 on a display unit of the PC 201.

FIG. 22 is a diagram illustrating an example of the acknowledgement-by-proxy popup window 260 according to the third exemplary embodiment.

Next, in steps S143 and S144, the printer driver waits for the user BBB set as a proxy for acknowledging receipt to select a YES button 2601 or a NO button 2602 on the acknowledgement-by-proxy popup window 260.

In a case where the YES button 2601 is selected by the user BBB set as a proxy (YES in step S143), the processing proceeds to step S145.

In step S145, the printer driver transmits an acknowledgement-by-proxy notification to the image forming apparatus 100 and closes the acknowledgement-by-proxy popup window 260, and the process in the PC 201 that is illustrated in the flowchart is ended.

On the other hand, in a case where the NO button 2602 is selected by the user BBB set as a proxy (NO in step S143 and YES in step S144), the printer driver closes the acknowledgement-by-proxy popup window 260, and the process in the PC 201 that is illustrated in the flowchart is ended.

In step S235 in FIG. 18, for example, in a case where the image forming apparatus 100 receives an acknowledgement notification from the PC 201 of the user BBB (YES in step S235), the processing proceeds to step S220. In step S220, the image forming apparatus 100 registers the completion in the job log. In this case, in step S220, the image forming apparatus 100 changes the recipient ID to "BBB" and the delivery status to "delivery completed (received)" in the job log management table 110 as in "NO. 4" in FIG. 23. Further, the image forming apparatus 100 updates the date and time to a timestamp of the receipt of the receipt completion notification. In a case where the NO button 2602 on the acknowledgement-by-proxy popup window 260 is pressed, the PC 201 does not transmit an acknowledgement-by-proxy notification. Although not illustrated, in a case where the image forming apparatus 100 does not receive an acknowledgement notification, the process in the flowchart is ended due to a timeout. In this case, the job log management table 110 is maintained in the state of "NO. 4" in FIG. 7A.

Further, a case where the printed material is received by the request user AAA in step S323 in FIG. 19 and the YES button 2301 on the receipt acknowledgement popup window 230 on the PC 200 is selected by the request user AAA will be described below. In this case, an acknowledgement notification from the PC 200 is received by the image forming apparatus 100 (step S235 in FIG. 18). In this case, the record in the job log management table 110 is as in "NO. 4" in FIG. 7B as in the first exemplary embodiment.

The same applies to a case where a delivery destination is designated and the printed material is received by a designated user in step S323 in FIG. 19.

Steps S213 to S220 in FIG. 18 according to the third exemplary embodiment are similar to those according to the first exemplary embodiment, and the redundant descriptions are omitted.

By performing the above-described processes, information indicating that a delivered printed material has been received by proxy by a user set as a proxy is recorded as a delivery log. This enables tracking of the printed material.

A case where a user selects the authenticated receipt checkbox 223 and sets the authentication setting according to the fourth exemplary embodiment will be described below.

Figure 24:
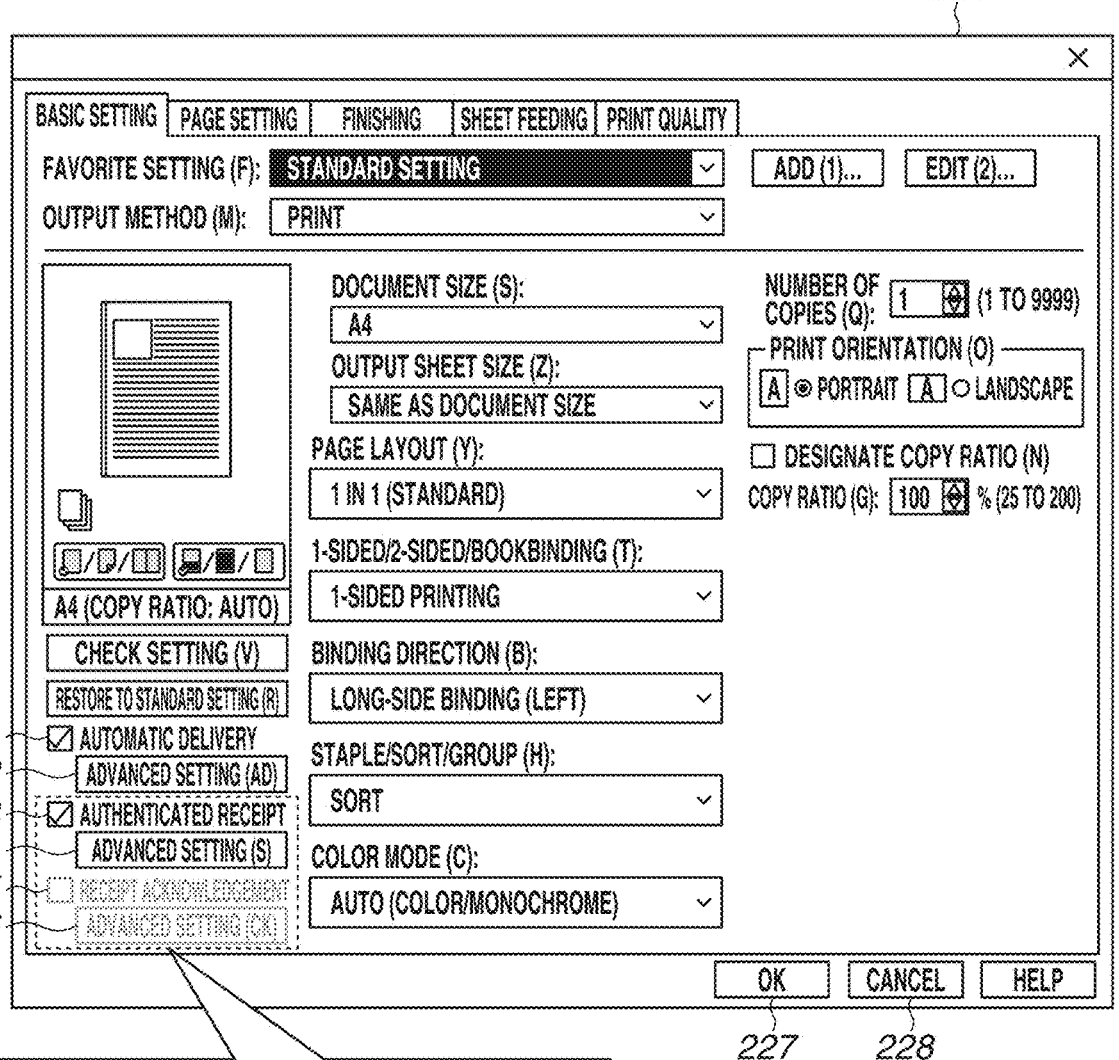
FIG. 24 is a diagram illustrating a printer driver setting screen according to a fourth exemplary embodiment.

FIG. 24 is a diagram illustrating an example of the printer driver setting screen 220 of the printer driver operating on the PC 200 according to the fourth exemplary embodiment.

As illustrated in FIG. 24, in a case where the authenticated receipt checkbox 223 is selected, an advanced setting (S) 224 of the authentication setting is enabled, and the receipt acknowledgement checkbox 225 and the advanced setting (CK) 226 of the receipt acknowledgement are disabled (grayed out). In a case where the authentication setting is set, the user needs to input authentication code information in order to receive a printed material from the automatic printed material delivery apparatus 300. Thus, a delivery reception completion notification alone can be sufficient to confirm that the printed material has been delivered. Thus, in a case where the authentication setting is set for receipt of a printed material, the above-described receipt acknowledgement processes according to the first to third exemplary embodiments can be omitted. In a case of a user who has received a printed material after authentication, requesting the user to perform a further operation to acknowledge the receipt causes inconvenience to the user.

In a case where the authenticated receipt checkbox 223 is selected by the user in FIG. 9A (YES in step S109), the printer driver grays out the receipt acknowledgement checkbox 225 and the advanced setting (CK) 226 of receipt acknowledgement as illustrated in FIG. 24 such that the receipt acknowledgement checkbox 225 and the advanced setting (CK) 226 of the receipt acknowledgement are not selectable.

Further, in step S110, the printer driver enables the advanced setting (AD) 222 and receives the authentication setting, and the processing proceeds to step S114.

In a case where the authentication setting is set for the job (YES in step S129), the printer driver skips steps S122 to S127, which are the process for acknowledging receipt by proxy, and the processing proceeds to step S128. Specifically, the process for acknowledging receipt by proxy is not performed.

By performing the above-described process, the receipt acknowledgement is automatically disabled in a case where the authenticated receipt is set. This prevents a user, who has received a printed material after authentication, from being requested to perform a complicated operation of acknowledging the receipt.

According to the above-described exemplary embodiments, information indicating whether a printed material has been delivered to a recipient user is managed as a delivery log. Managing receipt of a printed material leads to an improvement in security and prevention of leakage of confidential information from the printed material.

Configurations and details of various types of data described above are not limited to those described above, and it is obvious that data can have various configurations and details as suitable for intended uses and purposes.

While exemplary embodiments have been described above, embodiments of the present disclosure can be implemented in various forms such as a system, an apparatus, a method, a program, or a storage medium. Specifically, embodiments of the present disclosure are applicable to a system including a plurality of devices or an apparatus including a single device.

Further, all configurations formed by combining the above-described exemplary embodiments are also encompassed within the scope of the present disclosure.

The present disclosure is not limited to the above-described exemplary embodiments, and various forms within the spirit of the embodiments of the disclosure are also encompassed within the scope of the present disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-088376, filed May 31, 2022, which is hereby incorporated by reference herein in its entirety.

What is claimed is:

1. An image forming apparatus that outputs a printed material printed based on a print job to a delivery apparatus and requests the delivery apparatus to deliver the printed material, the image forming apparatus comprising:
   a printer that prints an image on a print medium;
   a storage device that stores a log of a print job;
   a controller having one or more processors which executes instructions stored in one or more memories, the controller being configured to:
   issue, in response to receipt of a completion notification indicating completion of delivery of the printed material based on the print job from the delivery apparatus, a first acknowledgement request for an acknowledgement of receipt of the printed material to an information processing apparatus corresponding to a user based on the print job;
   receives, from the information processing apparatus, a first acknowledgement notification indicating an acknowledgement of receipt of the printed material by the user based on a user operation performed on the information processing apparatus in connection with the first acknowledgement request; and in response to receipt of the first acknowledgement notification, cause the storage device to store information indicating receipt of the printed material by the user based on the print job as the log of the print job.

2. The image forming apparatus according to claim 1, wherein the user based on the print job is a user requested the print job.

3. The image forming apparatus according to claim 1, wherein the user based on the print job is a user designated by the print job.

4. The image forming apparatus according to claim 1,
wherein, in a case where an absence notification indicating that the printed material has been unreceived after a predetermined time has passed is received from the delivery apparatus before the completion notification is received, the controller issues a second acknowledgement request for an acknowledge of receipt of the printed material to an information processing apparatus corresponding to a proxy user designated by the print job as a proxy authorized to receive the printed material for the user based on the print job, and
wherein the controller registers, in response to receipt of a second acknowledgement notification, from the information processing apparatus, indicating acknowledgement of receipt of the printed material by the user based on a user operation performed on the information processing apparatus corresponding to the proxy user in connection with the second acknowledgement request, information indicating receipt of the printed material by the proxy user in the log of the print job.

5. The image forming apparatus according to claim 1,
wherein, in a case where an authentication setting with which authentication is performed to receive the printed material from the delivery apparatus is set for the print job, the controller does not issue the first acknowledgement request, and
wherein, in a case where the authentication setting is set for the print job, the controller does not register information about the user received the printed material based on the print job in the log of the print job.

6. A non-transitory computer-readable medium storing a printer driver configured to generate a print job of performing printing using an image forming apparatus and delivering a printed material using a delivery apparatus, the image forming apparatus including a printer that prints an image on a print medium, the printer driver including instructions configured to cause a computer to:
receive an acknowledgement request for an acknowledgement of receipt of the printed material, the acknowledgement request being transmitted from the image forming apparatus executing the print job in response to receipt of a completion notification indicating completion of delivery of the printed material based on the print job from the delivery apparatus;
receive, in response to receipt of the acknowledgement request, a user operation of acknowledging receipt of the printed material from the delivery apparatus by a user; and
transmit, in response to the user operation, an acknowledgement notification indicating an acknowledgement of receipt of the printed material by the user to the image forming apparatus.

7. The non-transitory computer-readable medium according to claim 6, wherein
in the transmitting, the acknowledgement notification is transmitted in order to cause the image forming apparatus to store, as a log of the print job, information indicating receipt of the printed material by the user based on the print job.

8. A system comprising an information processing apparatus, an image forming apparatus that outputs a printed material printed based on a print job to a delivery apparatus and requests the delivery apparatus to deliver the printed material, and the delivery apparatus that delivers the printed material received from the image forming apparatus,
the image forming apparatus comprising:
a print unit configured to print an image on a print medium;
a request unit configured to issue, in response to receipt, from the delivery apparatus, of a completion notification indicating completion of the delivery of the printed material based on the print job, an acknowledgement request for an acknowledgement of receipt of the printed material to an information processing apparatus corresponding to a user based on the print job; and
a receiving unit configured to receive an acknowledgement notification indicating an acknowledgement of receipt of the printed material by the user based on a user operation performed on the information processing apparatus in connection with the acknowledgement request; and
a storage unit configured to store, as a log of the print job, in response to receipt of the acknowledgement notification from the information processing apparatus by the receiving unit, information indicating receipt of the printed material by the user based on the print job,
the information processing apparatus comprising:
an operation unit configured to receive, in response to receipt of the acknowledgement request, a user operation of acknowledging receipt of the printed material from the delivery apparatus by the user; and
a first transmission unit configured to transmit, in response to the user operation, the acknowledgement notification to the image forming apparatus, and
the delivery apparatus comprising:
a second transmission unit configured to transmit, in response to detection of completion of the delivery of the printed material received from the image forming apparatus, the completion notification to the image forming apparatus.

9. The system according to claim 8, wherein
the second transmission unit transmits the acknowledgement notification in order to cause the image forming apparatus to store, as a log of the print job, information indicating receipt of the printed material by the user based on the print job.

* * * * *